United States Patent [19]

Kirk

[11] Patent Number: 5,170,698
[45] Date of Patent: Dec. 15, 1992

[54] APPARATUS FOR PEELING FRESH FRUIT

[75] Inventor: William Kirk, Alta Loma, Calif.

[73] Assignee: Sunkist Growers, Inc., Ontairo, Calif.

[21] Appl. No.: 689,634

[22] Filed: Apr. 23, 1991

[51] Int. Cl.⁵ ............................................. A23N 7/00
[52] U.S. Cl. ........................................ 99/472; 99/484; 99/516; 99/532; 99/584
[58] Field of Search ................. 99/472, 467, 468, 483, 99/509, 516, 534, 536, 537, 584, 538, 532, 484; 426/481, 482, 511

[56] References Cited

U.S. PATENT DOCUMENTS

| | | |
|---|---|---|
| 1,469,650 | 10/1923 | Sletto . |
| 1,553,630 | 9/1925 | Polk . |
| 1,872,732 | 8/1932 | Goranson et al. . |
| 1,920,095 | 7/1933 | McCall . |
| 2,224,235 | 12/1940 | Rogers . |
| 2,277,003 | 3/1942 | Polk, Jr. . |
| 2,283,290 | 5/1942 | Savage . |
| 2,286,649 | 6/1942 | Rogers . |
| 2,300,312 | 10/1942 | Polk, Sr. . |
| 2,465,223 | 3/1949 | Gross . |
| 2,551,156 | 5/1951 | Polk, Sr., et al. . |
| 2,570,071 | 10/1951 | Polk, Sr. et al. . |
| 2,639,746 | 5/1953 | Gross . |
| 2,699,191 | 1/1955 | DeBack et al. . |
| 2,776,690 | 1/1957 | Warren . |
| 3,126,930 | 3/1964 | Vosti et al. ............. 99/584 X |
| 3,237,299 | 3/1966 | Gibbs . |
| 3,473,588 | 10/1969 | Loveland . |
| 3,515,188 | 6/1970 | Morikawa et al. . |
| 3,566,941 | 3/1971 | Morikawa ............... 99/516 |
| 3,618,651 | 11/1971 | Hart et al. . |
| 3,700,017 | 10/1972 | Vincent et al. . |
| 3,759,166 | 9/1973 | Trandin et al. ........... 99/472 |
| 3,853,050 | 12/1974 | Schier .................... 99/590 |
| 3,970,762 | 7/1976 | Askienazy et al. . |
| 3,982,037 | 9/1976 | Weaver et al. ............ 426/482 |
| 3,982,482 | 9/1976 | Webb et al. ............... 99/491 |
| 4,065,582 | 12/1977 | Webb et al. ............... 426/231 |
| 4,109,021 | 8/1978 | Loveland .................. 426/482 |
| 4,130,668 | 12/1978 | Otsuka et al. ............. 426/287 |
| 4,161,459 | 7/1979 | Otsuka et al. . |
| 4,220,670 | 9/1980 | Mohri et al. .............. 426/287 |
| 4,275,648 | 6/1981 | Mouri et al. .............. 99/483 |
| 4,279,263 | 7/1981 | Pulliam . |

(List continued on next page.)

FOREIGN PATENT DOCUMENTS 2207657 6/1974 France .

OTHER PUBLICATIONS

Kosuke Aizawa, Takashisa Tozuka, Takenori Onishi and Ilajime Koga, "Segmentshin Removal of Mandarin Oranges with Enzyme", Shokuhin Kaihatsu, (1975).

Primary Examiner—Timothy F. Simone
Attorney, Agent, or Firm—Stephen J. Koundakjian

[57] ABSTRACT

An apparatus peels fruit, in particular citrus fruit, by washing and sterilizing the fruit in a sterilizing bath. The washed and sterilized fruit is delivered to a perforator which makes a plurality of perforations through the outer surface of the peel of the fruit over its entire surface. The perforated fruit is then delivered to a conveyor which loads and orients the fruit so that it is spinning on the stem axis with the equator of the spinning fruit exposed to a plurality of slitting knives. The knives slit an equatorial cut through the outer surface of the peel. The slit and perforated fruit is then delivered to a carousel of canisters. Each canister is filled with fruit and an aqueous solution of a commerical pectinase. The solution is vacuum infused into the fruit so that the albedo attaching the peel to the fruit substantially disintegrates over a predetermined time period. The pectinase solution is drained from the canister, and the treated fruit with a lossened peel is delivered to a peel removal section of the apparatus. The peels are removed in two hemispheres leaving the fruit meat intact. The intact fruit meat is then brushed to remove any remaining albedo or strings. The brushed meat is then delivered to a hydrocooler which cools the meats to nearly 0 degrees C. The cooled meats are then packaged in trays, labelled, sealed and packed in shipping cartons.

41 Claims, 13 Drawing Sheets

U.S PATENT DOCUMENTS

| | | |
|---|---|---|
| 4,284,651 | 8/1981 | Bruemmer . |
| 4,294,861 | 10/1981 | Ifuku et al. ............... 426/481 X |
| 4,300,448 | 11/1981 | Hayashi et al. ............ 99/537 X |
| 4,318,339 | 3/1982 | Sage ................................ 99/589 |
| 4,361,084 | 11/1982 | Raatz ........................... 99/584 X |
| 4,470,344 | 9/1984 | Bushman ........................ 99/509 |
| 4,490,335 | 12/1984 | Marey et al. . |
| 4,562,772 | 1/1986 | Battistini ........................ 99/472 |
| 4,569,850 | 2/1986 | Harris et al. ................... 426/482 |
| 4,720,388 | 1/1988 | Pierce et al. ................... 426/231 |
| 4,729,299 | 3/1988 | Hatch ............................. 99/491 |
| 4,760,780 | 8/1988 | Silvestrini et al. ........... 99/516 X |
| 4,771,682 | 9/1988 | Ishikawa ......................... 99/593 |
| 4,839,181 | 6/1989 | MacMurray et al. ........... 426/237 |
| 4,889,045 | 12/1989 | Backus ........................ 99/584 X |
| 5,046,411 | 9/1991 | LeGrand et al. ................ 99/472 |

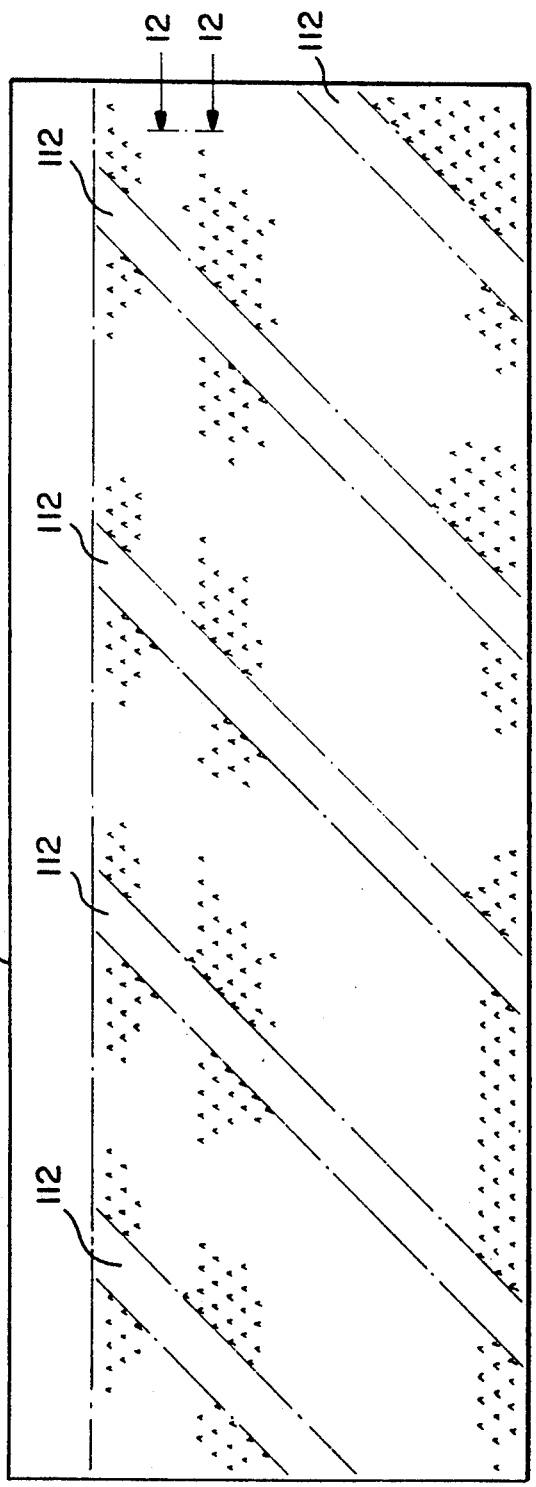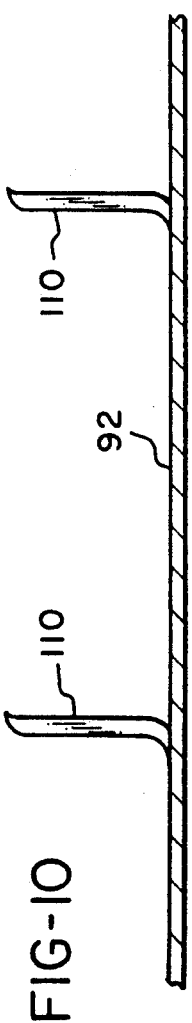

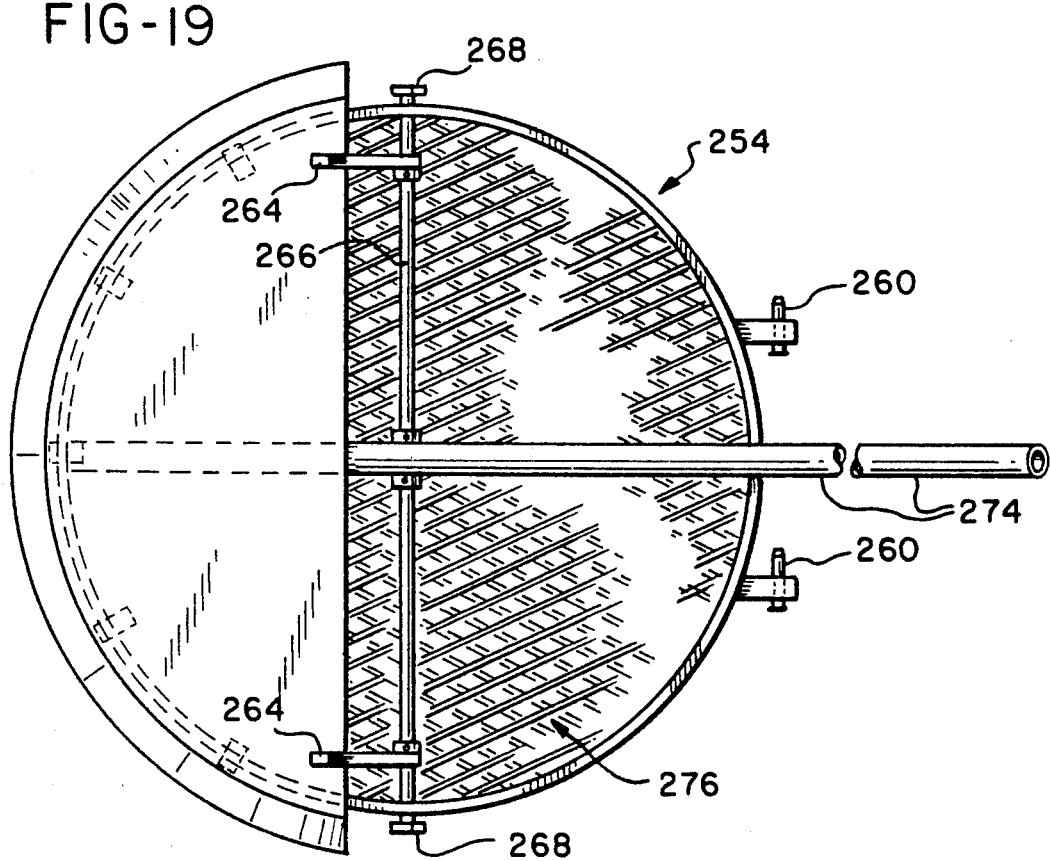
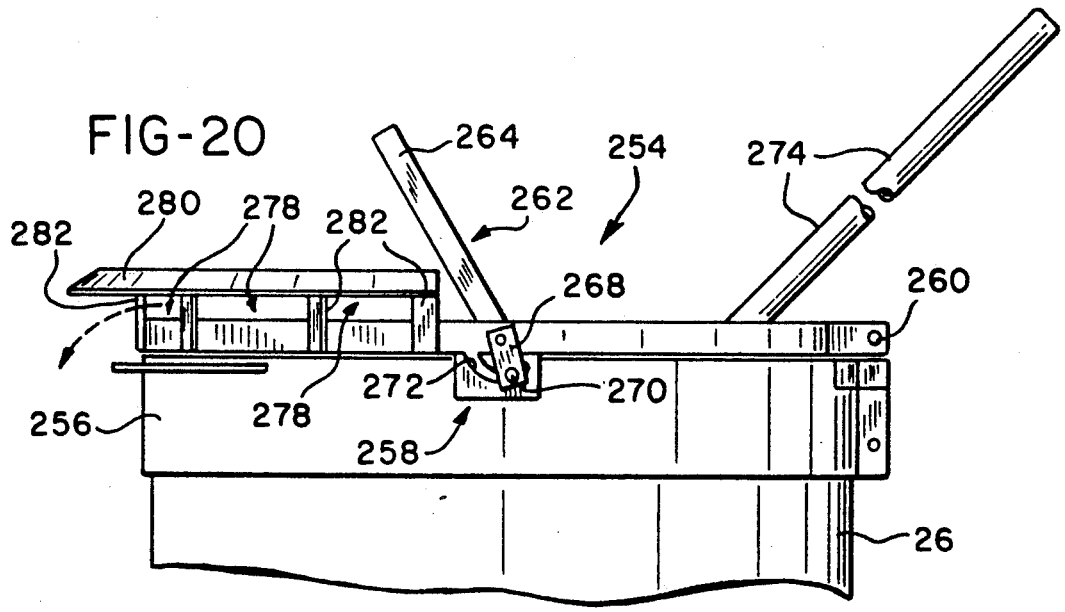

APPARATUS FOR PEELING FRESH FRUIT

BACKGROUND OF THE INVENTION

1. Field of the Invention

The invention relates to the field of methods and apparatus for peeling fresh fruit and in particular to a method and apparatus for peeling citrus fruits when the albedo is enzymatically degraded as part of the peel removal process.

2. Description of the Prior Art

The invention may be applied to articles other than citrus. However, since a principal application is to citrus fruit, reference will be made primarily to citrus fruit. A citrus fruit comprises an outer peel which adheres to the inner meat by means of an albedo layer. The meat, in turn, comprises a number of segments, each enclosed by a membrane. The segments are arranged about an axial core. The equator of the fruit is herein defined on the outer surface of its peel as the greatest circumference about its axis.

Although fruit, and in particular citrus fruit, is sold and consumed in large quantities with its peel intact, there is nevertheless a market demand where consumers or users of citrus fruit would prefer or even require that the fruit be provided whole and fresh, but peeled. Hand peeling of fresh citrus fruit is extremely time consuming, particularly if the albedo is to be removed from the fruit. The cost to hand peel large quantities of citrus fruit causes the delivery of peeled citrus products to be expensive and thereby diminishes or prohibits many of the market applications which might otherwise be available.

Therefore, the prior art has devised various apparatus and methods for peeling fruit, and in particular citrus fruit.

One class of such prior art methods involves mechanically peeling, cutting or skinning the peel from the fruit. Many types of mechanical peelers have been devised over the years. Such devices either require a fruit of relatively constant diameter; cutting the fruit, regardless of its size, down to a predetermined diameter, or employing a cutting mechanism riding on the surface of the fruit which assumes a predetermined thickness of the peel and its underlying albedo.

One of the more recent examples of such mechanized fruit cutting devices, which utilizes a sensed impedance between the cutter blade and a ground through the fruit, is shown by Webb et al, "Fruit Peeling Apparatus," U.S. Pat. No. 3,982,482 (1976); and Webb et. al., "Fruit Peeling Method," U.S. Pat. No. 4,065,582 (1977). Another device which mechanically cold peels citrus fruit is shown by Sage, "Apparatus For Cold Peeling Citrus Fruit," U.S. Pat. No. 4,318,339 (1982). Another approach, using a circular knife inserted between the meat and the peel, is shown by Schier, "Apparatus for Peeling Fruit, Such As a Lemon and Slicing the Rind," U.S. Pat. No. 3,853,050 (1974). The use of stripping rollers which repeatedly cut strips of peel from citrus is shown by Morikawa et al, "Prepared Citrus Fruit Processing Apparatus," U.S. Pat. No. 3,515,188 (1970).

A device which abrades or rubs the peel from the fruit is described by Warren, "Skin Separator," U.S. Pat. No. 2,776,690 (1957). Another example of the use of an abrading device to remove fruit peels is shown by Hart, "System For Peeling Fruits and Vegetables," U.S. Pat. No. 3,618,651 (1971). The individual measurement of each fruit and its mechanical manipulation to then individually orient it through a series of cutters is described by Hatch, "Citrus Fruit Peeling Machine," U.S. Pat. No. 4,729,299 (1988).

The prior art has also devised various methods whereby heating and cooling cycles are applied to the fruit or fruit product to remove its outer covering or skin. Such examples are shown by Harris et al, "Method For Thermally Blasting Outer Coverings From Food Products." U.S. Pat. No. 4,569,850 (1986); Weaver et al, "Peeling Fruits and Vegetables by Multiple Heatings and Coolings", U.S. Pat. No. 3,982,037 (1976); and Savage, "Process For Treating Citrus Fruits." U.S. Pat. No. 2,283,290 (1942).

Still further, the prior art has devised methods wherein the use of laser energy is applied to a fruit product to vaporize the skin, MacMurray et al, "Method of Removing Outer Protective Layer From Edible Materials Using Laser Energy," U.S. Pat. No. 4,839,131 (1989).

Chemical processes are available to loosen or remove the peel, usually involving the use of various types of alkali solutions. Such methods are illustrated by Mohri et al. "Method For Chemically Peeling Fruits and Vegetables," U.S. Pat. No. 4,220,670 (1980); Otsuka et al, "Composition For Chemically Peeling Fruits and Vegetables," U.S. Pat. No. 4,161,459 (1979); Otsuka et al, "Method For Chemically Peeling Fruits and Vegetables," U.S. Pat. No. 4,130,668 (1978); and Askienazy et al, "Method of Chemical Peeling of Fruits and Vegetables With an Alkanolamine," U.S. Pat. No. 3,970,762 (1976).

The art has also devised methods whereby the albedo and segment membranes of citrus fruits are degraded by the use of enzymes to produce individual segments, Bruemmer, "Method of Preparing Citrus Fruit Sections With Fresh Fruit Flavor and Appearance," U.S. Pat. No. 4,284,651 (1981). Another method is described in co-pending U.S. application Ser. No. 394,567 (1989), "Process For Enzyme Peeling of Fresh Citrus Fruit," Adams et al, assigned to the assignee of the present invention and incorporated by reference herein.

These methods, and in particular the latter one, are essentially natural processes which are merely accelerated versions of the breakdown of the albedo (pectin) layer of citrus peels caused by the pectinase naturally occurring therein. This natural phenomenon may readily be observed in untreated, overripe citrus fruits wherein the peel progressively loosens as the fruit ages.

However, the prior art describes no special means or apparatus for physically removing the peel which is loosened or degraded in some manner by the chemical process. Typically, chemical degradation of the citrus peel does not remove the peel from the fruit, but only tends to weaken its attachment. Thereafter, the peel must actually be removed from the fruit by conventional hand processes or using hand peeling tools.

What is needed is a method and apparatus for removal of the peel from citrus fruit or other fruits and vegetables, which can be automated and which is not subject to the complexities, inflexibility and unreliability of prior art mechanical cutting, stripping and peeling apparatus, and which can use to advantage peel degradation like that provided by chemical and enzymatic processes, but without the hazards or inefficiencies of fruit handling which may be connected therewith.

BRIEF SUMMARY OF THE INVENTION

The invention is an apparatus which may be applied to peeling fruit having a meat and a peel adhered to and covering the meat, comprising a first mechanism for providing access to at least a portion of the fruit between the meat and the outer surface of the peel. This first mechanism comprises a mechanism for perforating the outer surface of the peel and a mechanism for disposing a fluid beneath the outer surface of the peel to weaken the attachment between the peel and the meat. Further mechanisms then remove the peel from the meat after its attachment to the meat has been weakened. As a result, large quantities of fruit may be inexpensively peeled.

The mechanism for removing the peel includes a mechanism for slitting the outer surface of the peel. The latter mechanism circumferentially slits the outer surface of said peel into two substantially equal portions.

The mechanism for disposing the fluid beneath the outer surface of the peel comprises means to infuse the fluid between the outer surface of the peel and the meat.

The invention is also a method which is applicable to peeling fruit having a meat and a peel. The method comprises the step of providing access to at least a portion of the fruit between the outer surface of the peel and meat, typically following a prior step of sterilizing the surface of the fruit. A fluid is disposed in the portion of the fruit between the outer surface of the peel and the meat to weaken attachment of the peel to the meat. The peel is then removed from the meat. The step of providing access to at least a portion of the fruit between the meat and the outer surface of the peel comprises the step of perforating the outer surface of the peel more or less uniformly over its surface.

The step of disposing the fluid into the fruit comprises the step of infusing the fluid into the fruit typically under vacuum or pressure. The fluid infused into the fruit may comprise a solution of commercial pectinase maintained at a temperature typically below 20 degrees C.

The method further comprises steps of orienting the fruit into a predetermined angular orientation, and making a substantially equatorial cut through the outer surface of the peel.

The method also comprises the steps of removing the peel from the fruit, cooling the fruit meat to a temperature near the freezing point and packaging the fruit meat while maintaining its temperature at a low level.

The invention and its various embodiments can better be visualized by referring to the following drawings, wherein like elements are referenced by like numerals.

BRIEF DESCRIPTION OF THE DRAWING

FIG. 8 is a plan view of the interior of the perforator drum as seen when laid out flatly.

FIGS. 9a and 9b are side and end views respectively of the drum interior of FIG. 8.

FIG. 10 is the side view in enlarged scale of two teeth from sectional area 10—10 of FIG. 8.

FIG. 19 is a top elevational view of a pour lid used on the canisters of the carousel of FIGS. 1 and 2.

FIG. 20 is a side view of the lid of FIG. 19 shown positioned on a canister.

Figure 1:
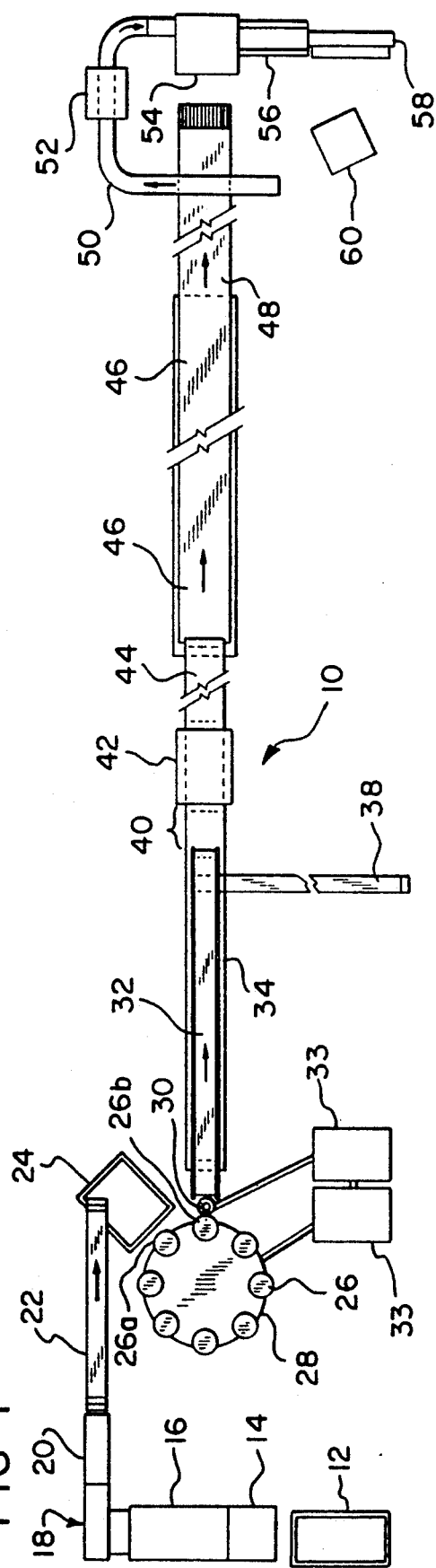
FIG. 1 is a simplified plan view layout of a system for peeling citrus fruit according to the invention.

The invention and its various embodiments may be better understood by now turning to the following detailed description.

DETAILED DESCRIPTION OF PREFERRED EMBODIMENTS

The System Generally

According to the preferred embodiment of the present invention, fruit, in particular citrus fruit, is first sterilized in a sterilizing bath. The sterilized fruit is delivered to a perforator which makes a plurality of perforations through the outer surface of the peel of the fruit over its entire surface. The perforated fruit is then delivered to a conveyor which loads and orients the fruit so that it is spinning on the core axis with the equator of the spinning fruit exposed to a plurality of slitting knives. The knives slit an equatorial cut through the outer surface of the peel. The slit and perforated fruit is then delivered to a carousel of canisters. Each canister is filled with fruit and an albedo degrading solution, such as an aqueous solution of commercial pectinase or mixture of pectinase solutions. The solution is vacuum infused into the fruit so that the albedo attaching the peel to the fruit substantially disintegrates over a predetermined time period. The pectinase solution is drained from the canister and the treated fruit with a loosened peel is delivered to a peel removal section of the system. The peels are removed in two hemispheres, leaving the meat intact. The intact meat is then brushed to remove any remaining albedo or strings. The brushed meat is then delivered to a hydrocooler which reduces the meat temperature to near freezing. The cooled fruit meats are then packaged in trays, labelled, sealed and packed in shipping cartons.

As briefly summarized above, the invention is a system for peeling of fruit, which may be automated.

The system comprises a first mechanism for sterilizing the fruit before the fruit is delivered to a perforating mechanism. This sterilizing mechanism comprises a bath for holding a sterilizing fluid. A paddle wheel assembly forces fruit disposed in the bath beneath the surface of the fluid in the bath and conveys the fruit in a predetermined direction in the bath. A finger wheel lifts the sterilized fruit from the bath and generally organizes the fruit lifted from the bath into a row of fruit for delivery to the perforating mechanism.

The perforating mechanism comprises a receiving conveyor for receiving the sterilized fruit. The fruit is delivered to an interior surface of a rotating drum assembly. A plurality of teeth are disposed on the interior surface of the drum assembly for perforating the unpeeled fruit.

The drum assembly comprises a drum and a mechanism for inclining the drum. The drum has a longitudinal axis. Inclination of the drum induces movement of the fruit in a direction parallel to the longitudinal axis of the drum.

The plurality of teeth found on the interior surface of the drum assembly are defined in spiral swaths on the interior surface. The spiral swathes are separated by portions of the interior surface without teeth disposed thereon.

The rotating drum assembly is comprised of a cylindrical drum riding on a plurality of casters. The castors are mounted on an inclinable frame. A motor is coupled to a pulley belt at one point and to the drum at an opposing section of the belt. The motor rotates the drum by means of the pulley belt. The drum is removable from the pulley belt and may be lifted from the casters without requiring detachment from other objects, so that the drum is easily replaceable within the assembly.

After passing through the perforating mechanism, the row of fruit is delivered to the slitter mechanism, so that the fruit is introduced into the slitter mechanism in sequential order as a file of fruit.

The mechanism for slitting the fruit comprises a conveyor for prepositioning the fruit prior to slitting, and a slitter assembly for slitting the fruit to thereby circumferentially penetrate the outer surface of the peel to the albedo layer beneath it. The conveyor comprises a loading portion for positioning the fruit on the conveyor with one unit of fruit disposed in one of a plurality of predetermined positions on the conveyor within the loading portion. The conveyor further comprises an orienting portion, wherein each unit of fruit disposed in the predetermined position within the conveyor is oriented into a predetermined spatial orientation. The fruit has a core axis and an equator defined about the core axis. The orienting portion of the conveyer orients the fruit so that the core axis is oriented along a predetermined direction and so that the equator defined about the core axis is exposed. The fruit is rotated generally about the core axis. The assembly cuts a circumferential cut through the outer surface of the peel of the fruit, approximately along the equator of the fruit.

The slitter assembly comprises a driven belt, comprising a pair of symmetrically disposed belts, selectively disposed into contact with the fruit to increase the fruit spin velocity. The system further comprises one or more knives resiliently disposed between the pair of belts so that the spinning fruit comes into contact with the knife or knives, and the knife or knives cut(s) through the outer surface of the peel. Each of the knives is resiliently urged toward the fruit to cut through the outer surface of the peel without substantially cutting into the meat. The driven belt is driven at a linear speed greater than the linear velocity of the surface of the fruit when spinning.

Each knife comprises a knife holder body, a blade retained within the knife holder body and a pair of wheels symmetrically disposed on each side of the blade for contact with the fruit. The blade extends beyond the wheels to cut into the outer surface of the peel of the fruit. A compression spring is disposed between the knife holder body and the blade to urge the blade away from the knife holder body toward the fruit.

The mechanism for infusing the fluid comprises a mechanism for vacuum infusing the fluid into the fruit. The mechanism for vacuum infusing the fluid into the fruit infuses a commercial pectinase solution or mixture of pectinase solutions (or other albedo degrading fluid) at a temperature preferably below 20 degrees C (celsius), although solution at a higher temperature might be utilized.

The mechanism for disposing a fluid between the outer surface of the peel and the meat of the fruit comprises a plurality of canisters for holding the fruit in the fluid. A carousel, upon which the plurality of canisters is mounted, rotates the canisters from a loading position to a delivery position within a predetermined time interval. A mechanism is provided for infusing the fluid between the outer surface of the peel and meat of the fruit.

The system further comprises a pouring lid selectively provided to that one of the plurality of the canisters in the delivery position. The pouring lid retains the fruit within the canister as the canister is tipped to pour the fluid from the canister. The pouring lid includes a mechanism for directing flow of the fluid from the canister when poured from the canister.

The mechanism for removing the peel from the meat of the fruit further comprises a mechanism for removing remnants of attachments of the peel to the meat.

The system further comprises a mechanism for packing the solid fruit meats. The system also comprises a mechanism for cooling the fruit meats to near the freezing point (of water) prior to their being packed by the mechanism for packing.

These and the other mechanisms which may be included in the system of the present invention will be discussed more fully in connection with the ensuing description of the preferred embodiment.

Figure 2:
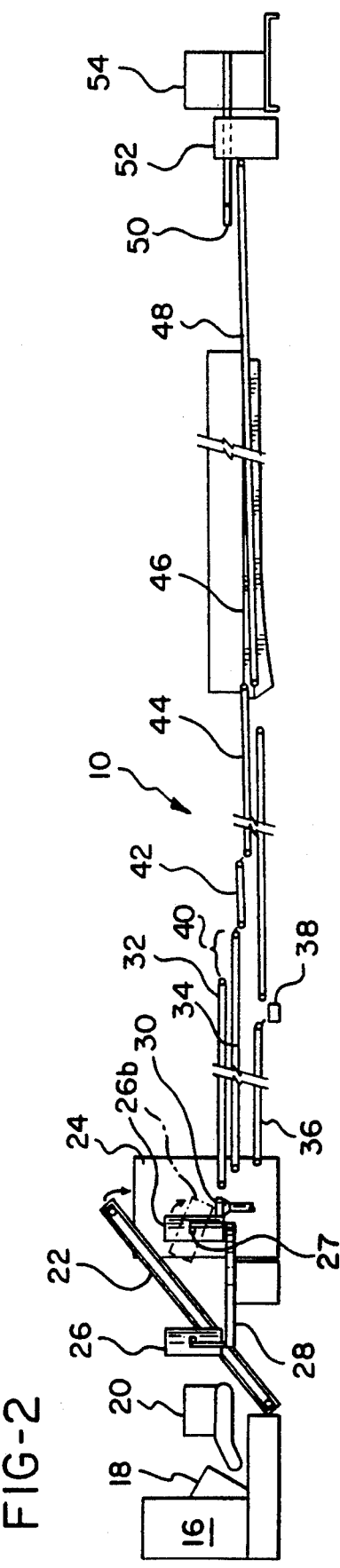
FIG. 2 is a simplified side elevation view of the system depicted in FIG. 1.

Consider now the preferred embodiment of the invention as shown in the Drawing. FIGS. 1 and 2 are simplified diagrammatic views of the layout of system 10 of the invention. FIG. 1 is a plan top view, while FIG. 2 is a side elevational view of system 10. System 10 is comprised of loading area 12 in which the raw citrus fruit is assembled into portable bins or containers (not shown). The fruit is then loaded onto an inclined chute 14 which delivers the fruit to a sterilizer 16, which is shown and described in greater detail in connection with FIGS. 3 and 4.

Figure 4:
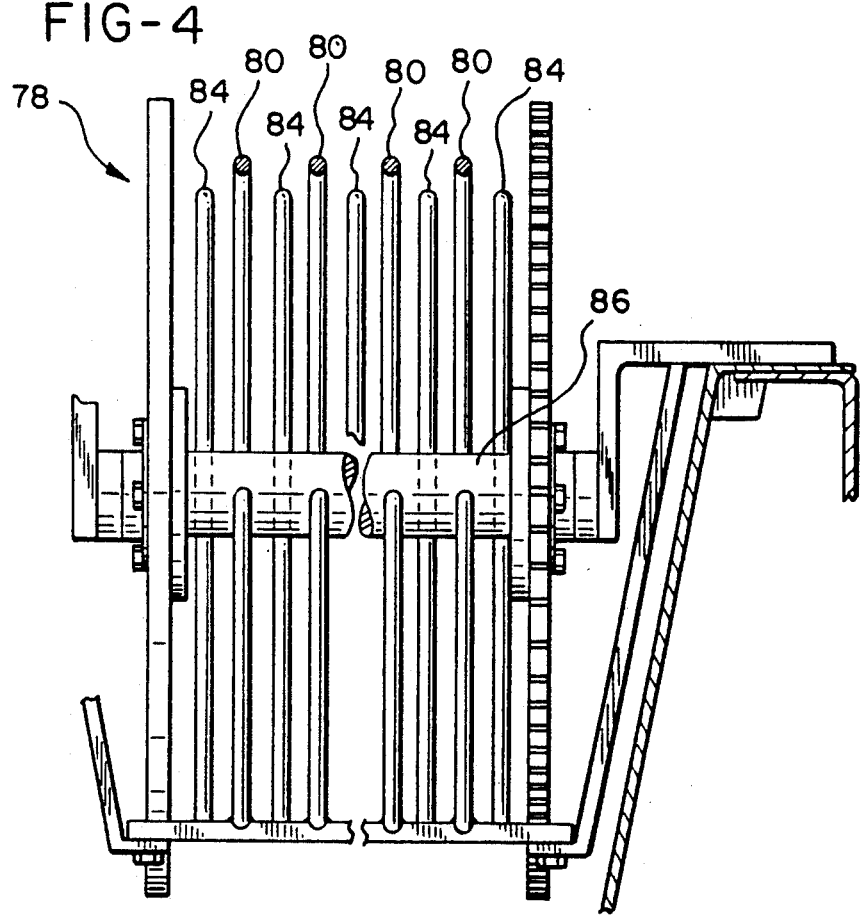
FIG. 4 is an end elevational view of the finger wheel used in the sterilizer of FIGS. 1 and 2.

The fruit (which in the case of citrus, floats), is sterilized in a bath by sterilizer 16 and delivered at the end of sterilizer 16 to a transfer device, shown and described in greater detail in connection with FIG. 4, which serves to organize the sterilized fruit into rows and deliver it as a file to a perforator 18.

Perforator 18 rotates the fruit and perforates the peel with a good distribution of penetrating holes extending through the outer surface of the peel and well into the albedo. The fruit meat itself is not substantially perforated.

The perforated fruit is then delivered from perforator 18 to slitter 20. Slitter 20 orients the fruit so that the longitudinal core axis of the fruit is generally horizontal and transverse to the forward progression of the fruit through the slitter. The oriented and perforated fruit then enters a knife mechanism included within the slitter, which cuts a clean equatorial slit around the fruit, which slit completely penetrates the outer surface of the peel and may extend partly into the albedo. Again, the meat of the fruit itself remains substantially uncut or unaltered.

The perforated and slit fruit is then delivered by slitter 20 to its elevator 22, which carries the fruit to a holding bin 24. The perforated and slit fruit is accumulated within holding bin 24 and then selectively delivered to one of the canisters 26a mounted on a carousel 28.

The fruit is then subjected to a process usually referred to as a vacuum infusing the albedo with enzyme. In the preferred embodiment of the invention and as described in co-pending U.S. application Ser. No. 394,567, the core temperature of the fruit is kept below approximately 20 degrees C. The fruit is vacuum infused within canisters 26 on carousel 28 with an enzyme solution, normally comprising an aqueous solution of commercial pectinase or a mixture of pectinase solutions, from enzyme tanks 33. The enzyme solution replaces the air bubbles or cells of the thick albedo layer of the fruit, and after the vacuum is released, it is retained in the albedo of the fruit. The fruit is then incubated for a predetermined time, such as 10-60 minutes, while being maintained at a temperature below 20 degrees C. The use of pectinase to degrade the albedo of citrus, in a general sense, is known in the art, and other enzymatic processes for degrading albedo are described in U.S. Pat. Nos. 3,347 678; 3,031,307, and 4,284,651.

Maintaining the meat temperature of the fruit at or below 20 degrees C. allows the albedo of the fruit to be degraded, thereby loosening the peel of the fruit, without substantially degrading the segment membranes. If the segment membranes were degraded (as might occur if a higher temperature enzyme solution and/or incubation were employed), this would tend to separate the fruit meat into segments, as taught in Bruemmer, U.S. Pat. No. 4,284,651. The latter is undesirable for the purposes of the preferred embodiment of the present invention, as it complicates the peel removal step, which is far simpler if the fruit meat is intact.

After incubation, the enzyme treated fruit is emptied from a canister at a final position, such as canister 26b into a hopper and fluid separator 30. Separator 30 allows the enzymatic solution to be poured off and returned to a collection tank 33 for reconstituting and reuse, while the treated fruit is gravity delivered from the separator 30 to a peeling conveyor 32. A canister lid, shown and described in greater detail in FIGS. 19 and 20, is used in this decanting process.

At this point, the peel is loose and puckered, and can be removed from the meat by simply twisting and lifting or prying apart the two slit peel hemispheres. Substantially all of the remaining albedo (which has not disintegrated) is retained to the peel and removed with it, leaving a virtually perfectly peeled, intact fruit meat. This separation and removal process occurs regardless of the size of the fruit and regardless of the thickness of the peel or albedo.

In the presently illustrated embodiment, twisting and lifting the hemispherical peel portions from the fruit is easily and quickly manually performed. An unskilled worker can peel several such fruit per minute. However, it is entirely within the scope of the invention that peeling conveyor 32 may be fully automated, so that the fruit is oriented, the hemispheres twisted, the peel removed from the fruit, and the fruit meat separated from the peel by automated mechanical means. For example, the fruit may be oriented into a pocket on the conveyer, and opposed suction fingers placed into contact with antipodal positions on the exterior of the peel. The suction fingers may vibrate, or turn, and/or pull apart, taking the peel hemispheres with them.

The peeled fruit is then delivered to fruit meat conveyor 34, while the removed peels drop into peel conveyor 36, as better illustrated in FIG. 2. The peels are then delivered to a peel disposal conveyor 38 and removed from system 10 for further processing, as desired, as a by-product.

The peeled fruit continues on conveyor 34 to an end portion 40. The peeled fruit then leaves portion 40 of fruit meat conveyor 34 and are delivered to a brush bed 42, wherein the peeled fruit is subjected to rotating long bristle brushes. Brush bed 42 is depicted and described in greater detail in connection with FIGS. 21 and 22. These brushes brush the outside of the peeled meats to remove any loose strings that tend to exist on and/or between the segments of citrus fruit, particularly in the case of some varieties of grapefruit. Although there is no nutritional or taste disadvantage to such strings, their presence may be regarded as non-aesthetic by some consumers.

The brushed fruit is then delivered to a final inspection conveyor 44, where a quality control inspector examines the processed fruit by a number of criteria, as may be established from time to time, depending upon commercial parameters and the nature of the fruit which is being processed. Any defective fruit or imperfectly peeled fruit can then be discarded or returned to the appropriate point within system 10 for further processing.

The approved and finally inspected fruit is then delivered from final inspection conveyor 44 to a hydrocooler which is at least partially implemented as a bath 46. The fruit meats still float, and are conveyed through the bath on an inclined plastic conveyor belt. Hydrocooler bath 46 cools the fruit meats to near freezing temperature (i.e., approximately 1 to 3 degrees C).

The inspected, cooled fruit meats are then delivered to a packing station 48, at which point the meats are placed within packaging, typically egg-carton-type trays with each fruit meat placed within a separate tray indentation. The packed trays are then placed on a U-shaped labelling and wrapping conveyor 50 which transports the packed trays to a label applicator 52.

Applicator 52 applies a product label to the tray, which may include, for example, a printed indication of gross weight, recommended utilization date and recommended storage temperature.

The labelled tray then proceeds on conveyor 50 to a conventional shrink wrap device 54. Shrink wrap device 54 encloses the labelled tray within the containment of a clear plastic wrap which, is then shrunk over the tray to form an airtight, sanitary seal.

The shrink wrapped trays are then delivered on a roller conveyor 56 to a carton packing station 58, on which the trays are stacked within protective shipping cartons. The packed cartons are then loaded on pallets at a pallet packing station 60 and removed to cold storage where they are maintained at near freezing temperature while awaiting distribution.

The layout of system 10 now having been generally described, we turn to consider in detail each of its component parts.

The Sterilizer

Figure 3:
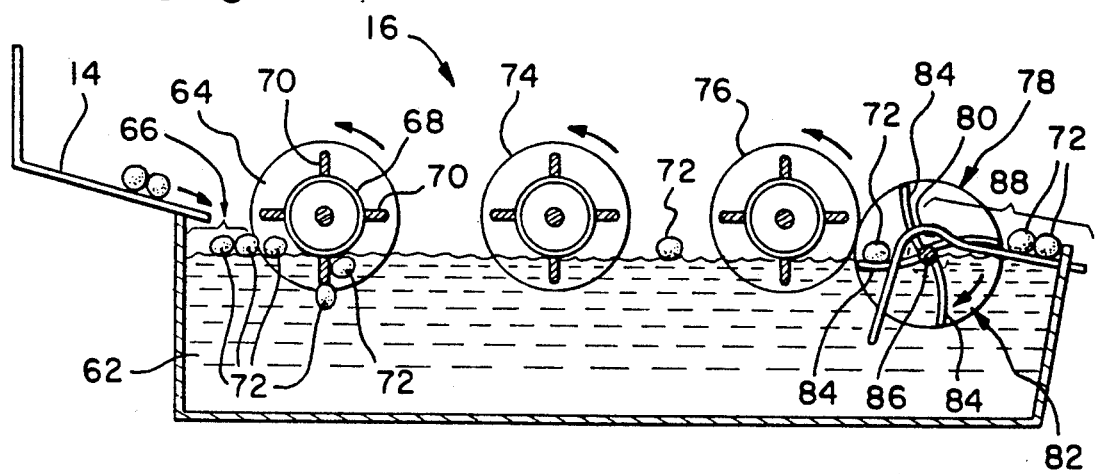
FIG. 3 is a diagrammatic side sectional view of the sterilizer of FIGS. 1 and 2.

Sterilizer 16 is depicted in simplified side sectional view in FIG. 3. As previously stated, raw fruit is delivered to hopper 14 which provides a gravity slide, down which the fruit rolls into a sterilizing bath 62. Bath 62 is a weak aqueous solution of hydrochloric acid and chlorine which serves to sterilize the surface of the fruit. Passage of the fruit is blocked by a first paddle wheel 64, so that substantially none or little of the fruit deposited in bath 62 can escape region 66 without the action of paddle wheel 64. Paddle wheel 64 is a four-paddled rotating wheel which collects the floating fruit and forces it into and below the surface of bath 62 by a combination of an inner drum 68 and four radial paddles 70. Inner drum 68 and paddles 70 force the fruit 72 down into bath 62 and to the right, as shown in the depiction of FIG. 3.

The fruit is moved to the right by first paddle wheel 64 and is next similarly engaged and submerged by an identical second paddle wheel 74. After having been submerged by paddle wheel 74, the twice submerged fruit is then again engaged by a third identical paddle wheel 76.

The thrice submerged fruit 72 is then delivered by third paddle wheel 76 to a finger wheel 78. Finger wheel 78 is to the right of third paddle wheel 76 and positioned somewhat lower, so that its center lies just above the surface of bath 62. As shown in FIGS. 3 and 4, finger wheel 78 includes a wire rack 80 and a rotating finger assembly 82 which is comprised in turn of a plurality of four curved fingers 84 radially directed from an inner drum 86. Since fruit 72 is floating on the surface, curved finger 84, which is rotating clockwise, as shown in the depiction of FIG. 3, comes from beneath fruit 72 and draws it toward inner drum 86. This tends to linearize (form a row of) fruit 72 picked up by each corresponding row of fingers 84. Fingers 84 are interleaved between corresponding wires within rack 80, as best depicted in FIG. 4. Rows of fingers 84 in the wires of rack 80 combine to generally assemble a row of fruit, which is then lifted up on rack 80 and rolled down its afterside 88.

The paddle wheels 64, 74, 76 are motively interconnected by means not shown, so that a single motor means (likewise not shown) drives them in unison. The periphery of paddle wheel 76 engages the periphery of finger wheel 78, so that paddle wheel 76 drives finger wheel 78 in the opposite rotational direction.

The row of fruit is then delivered to perforator 18. The row of fruit, which extends from left to right within sterilizer 16 in the depiction of FIG. 3, is delivered in the direction moving from the bottom to the top of the left region of FIG. 1 when it is delivered into perforator 18. Once delivered to perforator 18, the row then becomes a file and moves from left to right in the depiction of FIG. 1.

The Perforator

Figure 5:
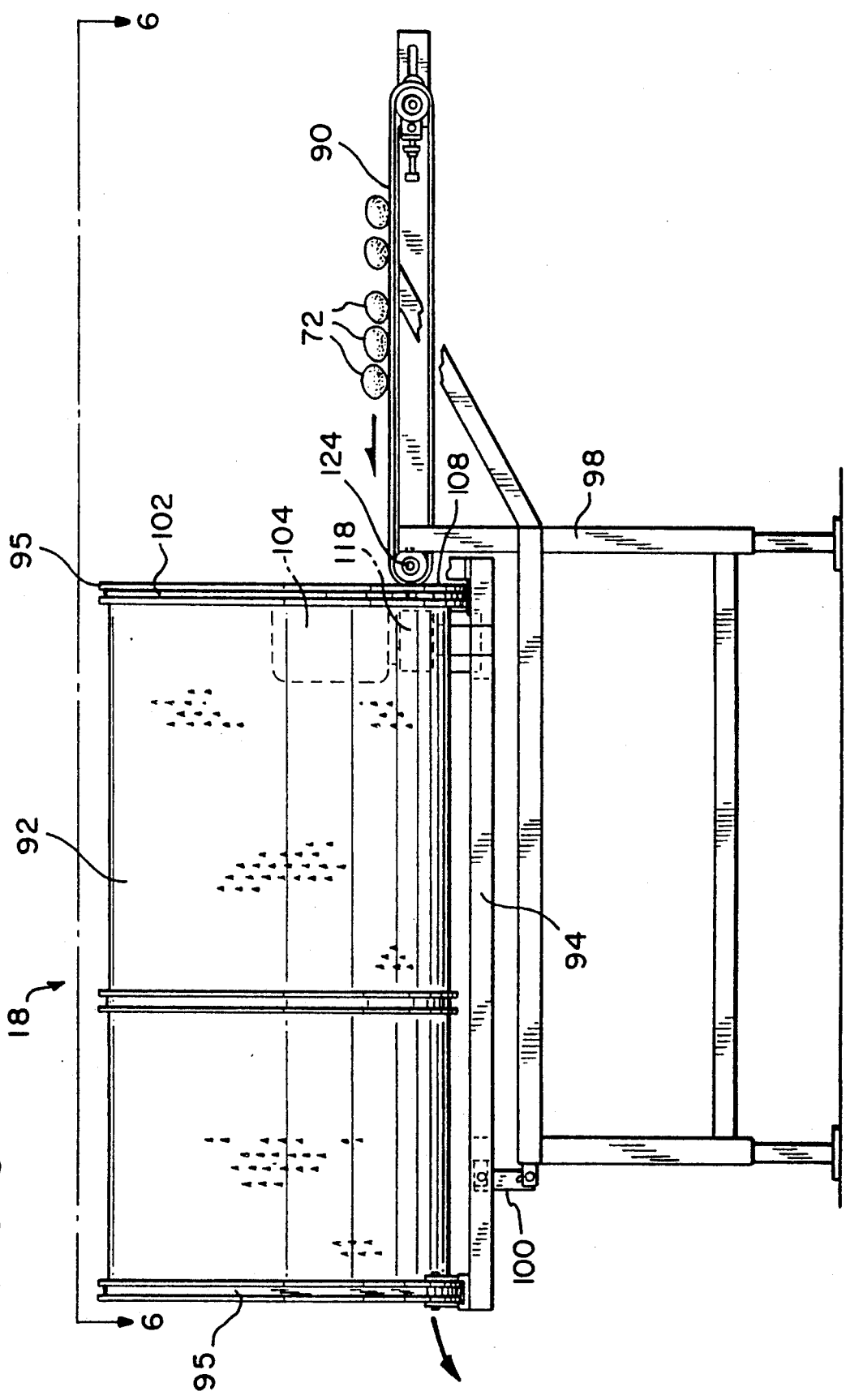
FIG. 5 is a side elevational view of the perforator of FIGS. 1 and 2.

We turn now to FIG. 5, wherein a simplified side elevation view of perforator 18 is depicted, and the flow of fruit is from right to left. The row of fruit is delivered from sterilizer 16 to a conveyor 90, which delivers the fruit as a file into the mouth of a perforating drum 92. Drum 92 is mounted on a moveable frame 94, which allows the inclination of drum 92 to be varied by the operator to accommodate different sizes and types of fruit. A lever operated strap or adjustment means 100 is provided at or near the left end of frame 94 to raise or lower the left end of drum 92 relative to the right end of drum 92. Frame 94 is pivoted by conventional means (not shown) at the right end of a frame 98, as seen in FIG. 5. A conventional cam and lever combination is used on the opposing left end of drum 92, as shown in the illustrated embodiment for means 100.

Figure 7:
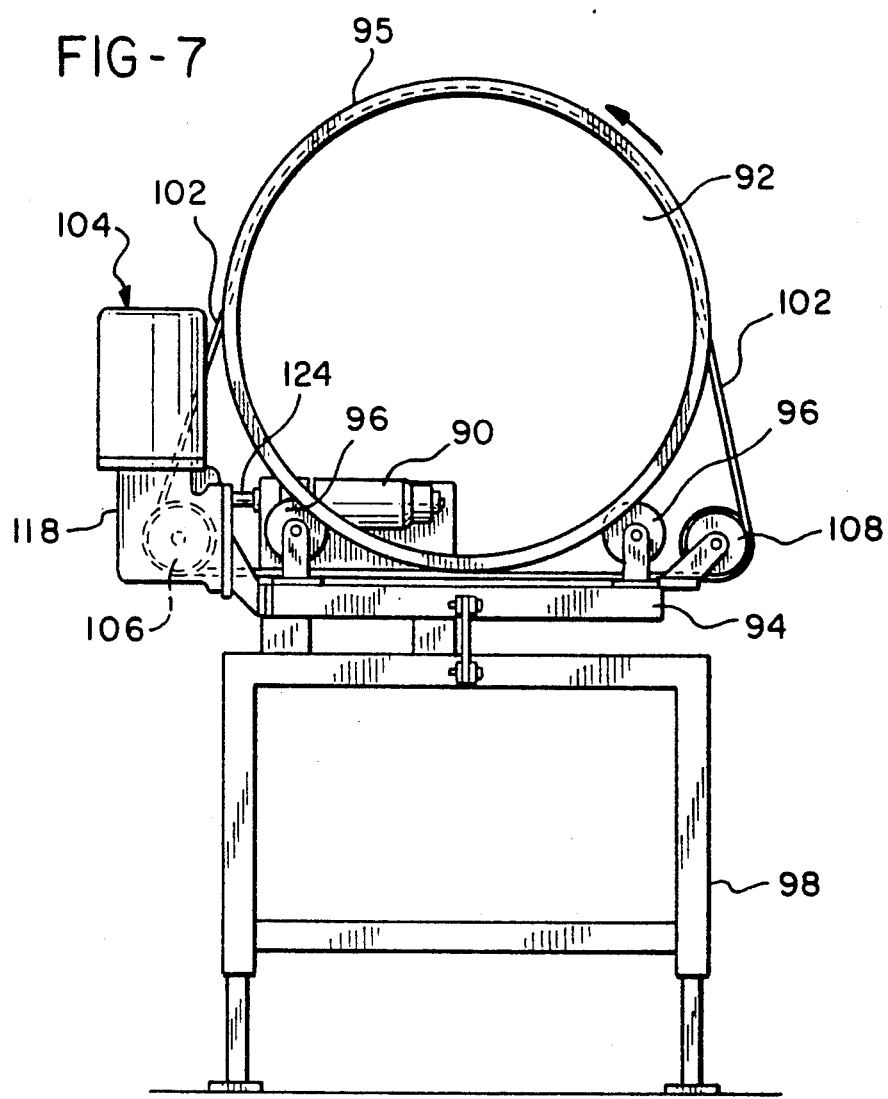
FIG. 7 is an end elevational view of the perforator of FIGS. 1 and 2.

Drum 92 includes two end channels 95 into each of which a pair of casters 96 are disposed and rotate, as best depicted in the end view of FIG. 7. Drum 92 is rotated by means of a belt 102 riding in the rightmost channel 95 and driven by motor 104. As best depicted in FIG. 7, belt 102 extends from a drive wheel 106, driven by motor 104, around channel 95 to an idler wheel 108 on the opposing side of frame 94, and thence under drum 92 back to drive wheel 106. It can now be appreciated that since drum 92 simply is supported at its ends by four casters 96 and driven by belt 102, it can be easily disengaged from the perforator assembly as a whole, lifted off and replaced. Ease of cleaning, maintenance and replacement are thereby insured.

Figure 11:
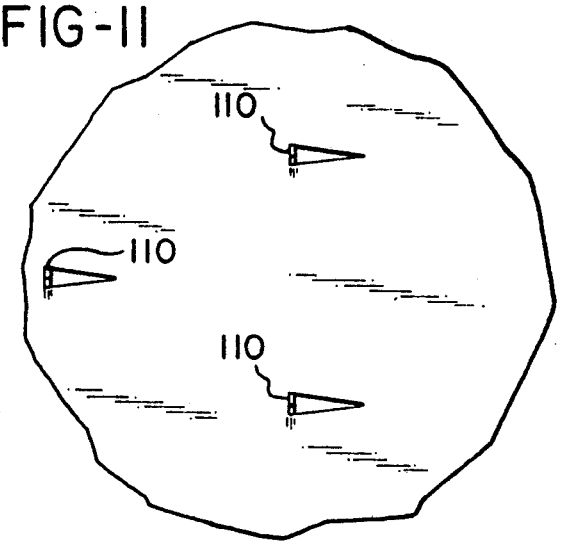
FIG. 11 is a top elevational view in enlarged scale of three teeth from sectional area 11—11 of FIG. 96.
Figure 12:
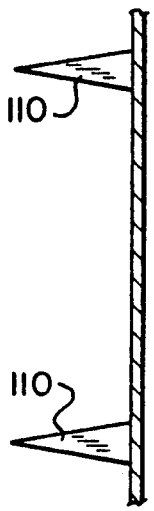
FIG. 12 is an end elevational view in enlarged scale of two teeth from sectional area 12—12 of FIG. 8.

The interior of drum 92 is provided with a multiplicity of spikes or sharp protrusions, best shown in a flat plan layout of FIG. 8 and in a side view of FIG. 10. Spikes 110 are better depicted in the enlargement of FIG. 10 in side view, FIG. 11 in top view, and FIG. 12 in a frontal depiction. Teeth 110 in the illustrated embodiment, are triangular shaped spikes punched out in a regular pattern from a stainless steel sheet which comprises the body of drum 92. In the illustrated embodiment, the height of teeth 110 is approximately 5/16", which is sufficient to penetrate the outer surface of the peel and albedo of citrus fruit but not to provide any significant penetration into the fruit meat or to otherwise fix the fruit to the impaling teeth. Teeth 110 are punched to be approximately 1" apart, as measured to the next nearest neighbor.

The pattern of teeth 110 in the stainless steel sheet of drum 92 is depicted in FIG. 8 as it would appear if the interior of drum 92 were laid out flatly and viewed from above. Teeth 110 are laid down in an inwardly facing direction within drum 92 such that there are smooth or toothless regions 112 defined on the interior surface of the drum. It can be understood that these regions 112 appear as spiral swathes within the toothed array in the interior of drum 92 when the surface of FIG. 8 is rolled into a cylindrical shape.

Figure 6:
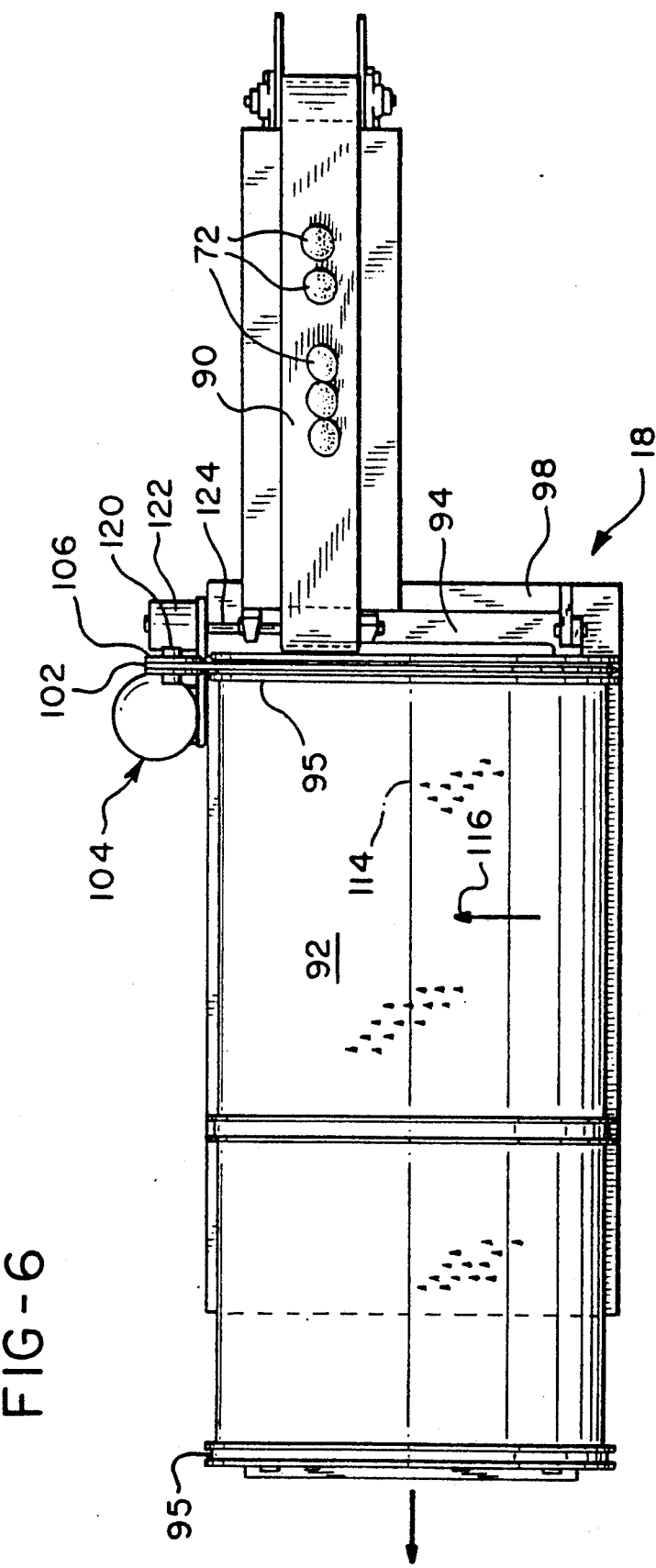
FIG. 6 is a top elevational view of the perforator of FIGS. 1 and 2.

As best depicted in the top plan view of FIG. 6, the fruit is delivered to conveyor 90, which is offset from the centerline 114 of drum 92. Drum 92 rotates counter-clockwise as seen in the depiction of FIG. 7 and as indicated by arrow 116 in FIG. 6. Fruit therefore enters the lower left quadrant of drum 92 as shown in FIG. 7, and a file of fruit is then emptied onto the toothed inner surface of the drum. If the fruit lands on teeth 110, teeth 110 perforate the outer surface of the peel and will carry the fruit to the right, as seen in FIG. 7, as the drum rotates. However, as the fruit begins to be pulled up the right hand wall of drum 92, the fruit will rotate or be pulled by gravity out of the teeth 110 which are impaling it, and will roll onto the adjacent teeth which will then further penetrate the outer surface of the peel.

As a result, the fruit will roll back toward the bottom of drum 92, whereby additional sections of the peel are perforated However, when the fruit reaches a smooth toothless section 112, the fruit will roll sideways on the smooth interior surface of drum 92 until it reaches the next toothed section of the drum. This will cause the fruit to be rotated so that a different strip or swath of the fruit is next perforated by teeth 110 In the illustrated embodiment there are 5 such smooth spiral sections, which rotate and perforate different sections of the fruit on multiple turns. The result is that when the fruit rolls down to the end of drum 92, because of its slight inclination on frame 98, it will be substantially, uniformly perforated about its entire surface. These perforations later allow the enzymatic solution to penetrate into the albedo, and release the trapped air within the albedo.

The Drive Mechanism(s) for the Perforator and Sterilizer

There is no need for the motive force of the sterilizer 16 to be synchronized with that of the perforator 18. While it is true that the progress of fruit through the two mechanisms should be reasonably uniform, the rate of fruit progress through the perforator 18 is regulated, not only by the speed at which drum 92 rotates, but also by the angle of inclination of the axis of the drum 92 with respect to the horizontal.

In the illustrated embodiment, the drive mechanism used to power perforator 16 comprises a motor 104, shown in FIGS. 5.7, connected to a gear reducer 118. Gear reducer 118 in turn has an output driveshaft 120 which is connected to drive wheel 106 used to drive belt 102 which rotates drum 92.

Driveshaft 120 is also coupled to a right angled gear drive 122. Gear drive 122 in turn has an output shaft 124 which is used to drive conveyor 90 through conventional means.

The Slitter

Figure 13:
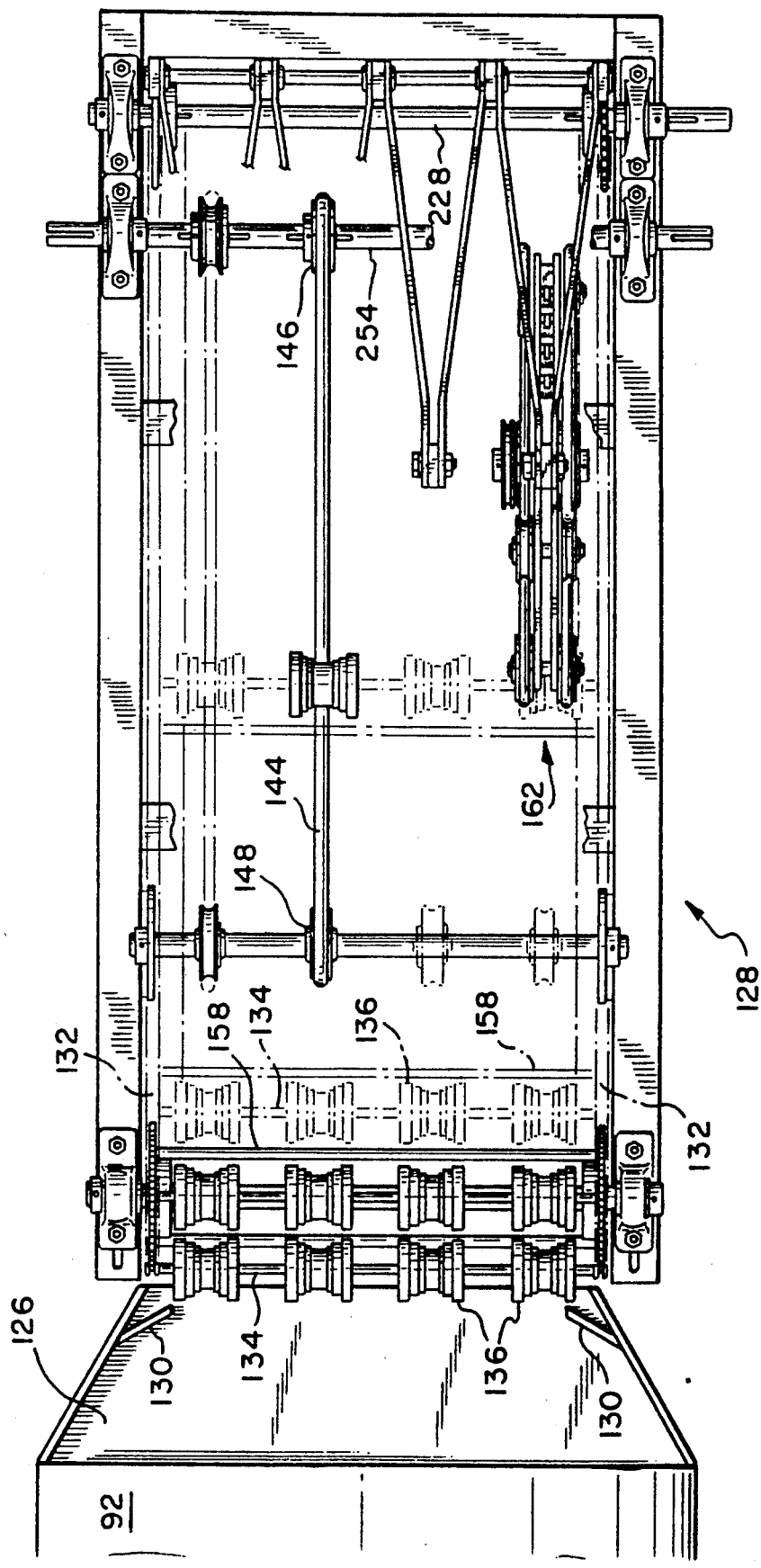
FIG. 13 is a top elevational view of the slitter of FIGS. 1 and 2 with numerous elements removed for the sake of simplicity of illustration.

As shown in FIG. 13, which is a plan elevation view of the slitter, with portions of the slitter removed for the sake of clarity and illustration, perforated fruit is delivered from the end of drum 92 to a hopper 126, which feeds the perforated fruit to the end of an orienting conveyor, generally denoted by a reference number 128. Hopper 126 may be provided with a number of anti-jam guards 130, which are positioned at awkward corners within hopper 126 in which fruit might otherwise jam and fail to be taken up by conveyor 128.

Figure 14:
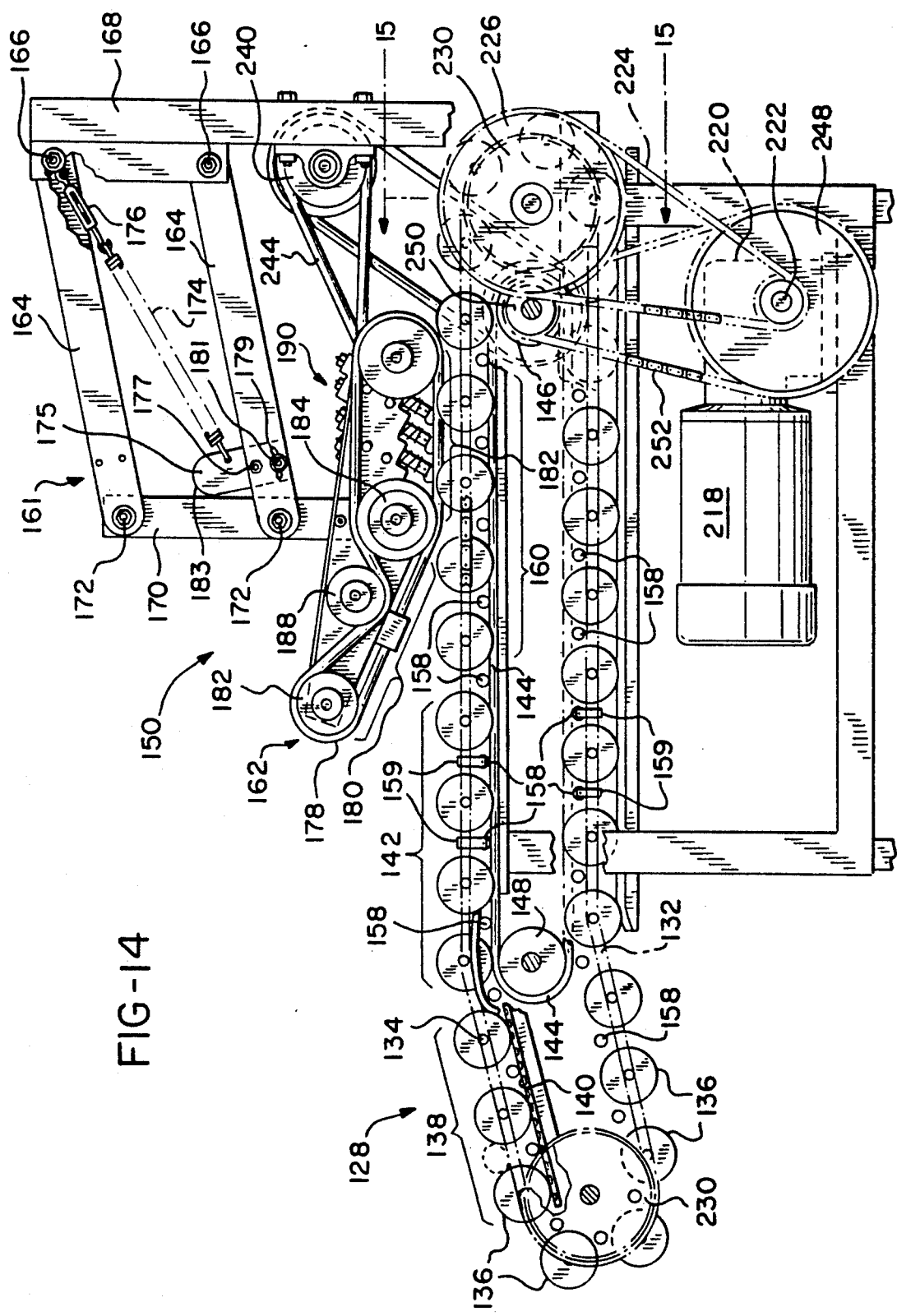
FIG. 14 is a side elevational view of the slitter of FIGS. 1 and 2 with numerous elements removed for the sake of simplicity of illustration.

Conveyor 128 orients the fruit such that the core axis is disposed generally out of the plane of the drawing of FIG. 14, which is a side elevation view of the slitter as depicted in FIG. 13.

Conveyor 128 is comprised of a left and right continuous chain 132 to which a plurality of cross bars 134 have been attached. On each cross bar 134 is a plurality of orienting spools 136. In the illustrated embodiment four such spools 136 are provided, as best depicted in FIG. 13. Each spool 136, in turn, is formed in the shape of a symmetrical series of segmented cylinders beginning with the largest diameter cylinder on the ends of spool 136, and then proceeding by a plurality of discrete steps of reduced diameter to a smallest innermost portion. A fruit, when in contact between two such spools, is known to be rotated such that the fruit essentially falls into the space between two adjacent spools. If there is any oblate quality to the fruit, which is almost always the case, it will become oriented so that the fruit will rotate about the axis of its section with the largest diameter and with the most nearly circular shape. The effect is similar to that achieved by the spin of a football when it is forward passed. In the case of most citrus fruit, the fruit is slightly oblate about the core axis, with the result that the core axis is oriented to be generally parallel to rod 134.

The fruit is picked up by spools 136, which are rotated in a clockwise direction as seen in FIG. 14, when they are pulled over section 138 of conveyor 128. Spools 136 are rotated by reason of being in contact with an underlying nonskid, traction pad 140. The fruit is thus picked up and generally oriented so that it rests on and between two adjacent spools 136, and so that there is only one unit of fruit between any two spools 136. Should two units of fruit attempt to nest between two adjacent spools 136 the upward incline of section 138 of conveyor 128 serves to eject or bounce one of the units of fruit from the nested position between spools 136.

Spool rotation in section 138 of conveyor 128 is only to facilitate loading of the perforated fruit onto the conveyor 128. Orientation of the fruit to facilitate slitting occurs in section 142 of the conveyor 128.

When the fruit reaches section 142 of conveyor 128, spools 136 are no longer in contact with traction pad 140, but come into contact with underlying driven pulley belts 144. Pulley belts 144 extend from driven pulleys 146 to idler pulleys 148 underneath spools 136 when in section 142 and to the right thereof, as depicted in FIG. 14. Spools 136 are rotated in a counter-clockwise direction at an increased rate of speed, as seen in FIG. 14. In the illustrated embodiment, spools 136 are rotated at approximately 370 RPM. The abrupt change in speed of rotation, as the fruit is handed off from loading section 138 to orienting section 142, causes the fruit to bounce or jump slightly in its nested position. As it continues to be juggled between two adjacent spools 136, it quickly orients itself, so that the core axis is generally horizontal (i.e., out of the plane of FIG. 14), parallel to rods 134 and the fruit is being spun so that the equator of the fruit is exposed as uppermost to the slitter mechanism generally denoted by reference number 150.

Figure 15:
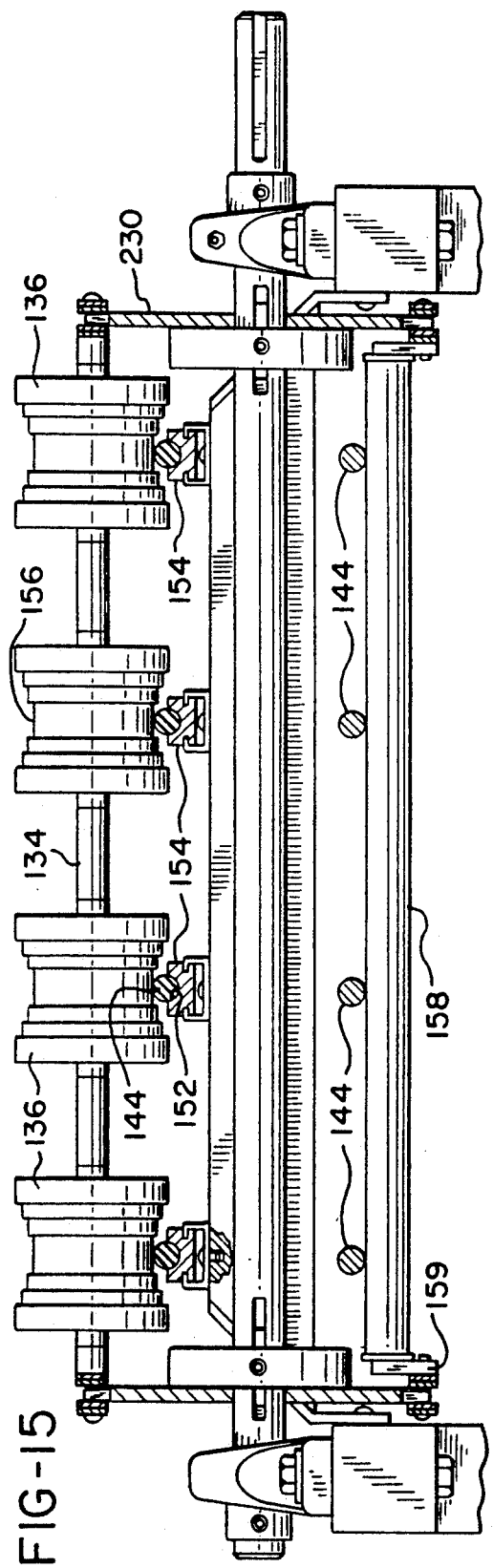
FIG. 15 is a sectional view in enlarged scale through lines 15—15 of the conveyer belt of the slitter of FIG. 14 with elements removed for the sake of simplicity of illustration.
Figure 16:
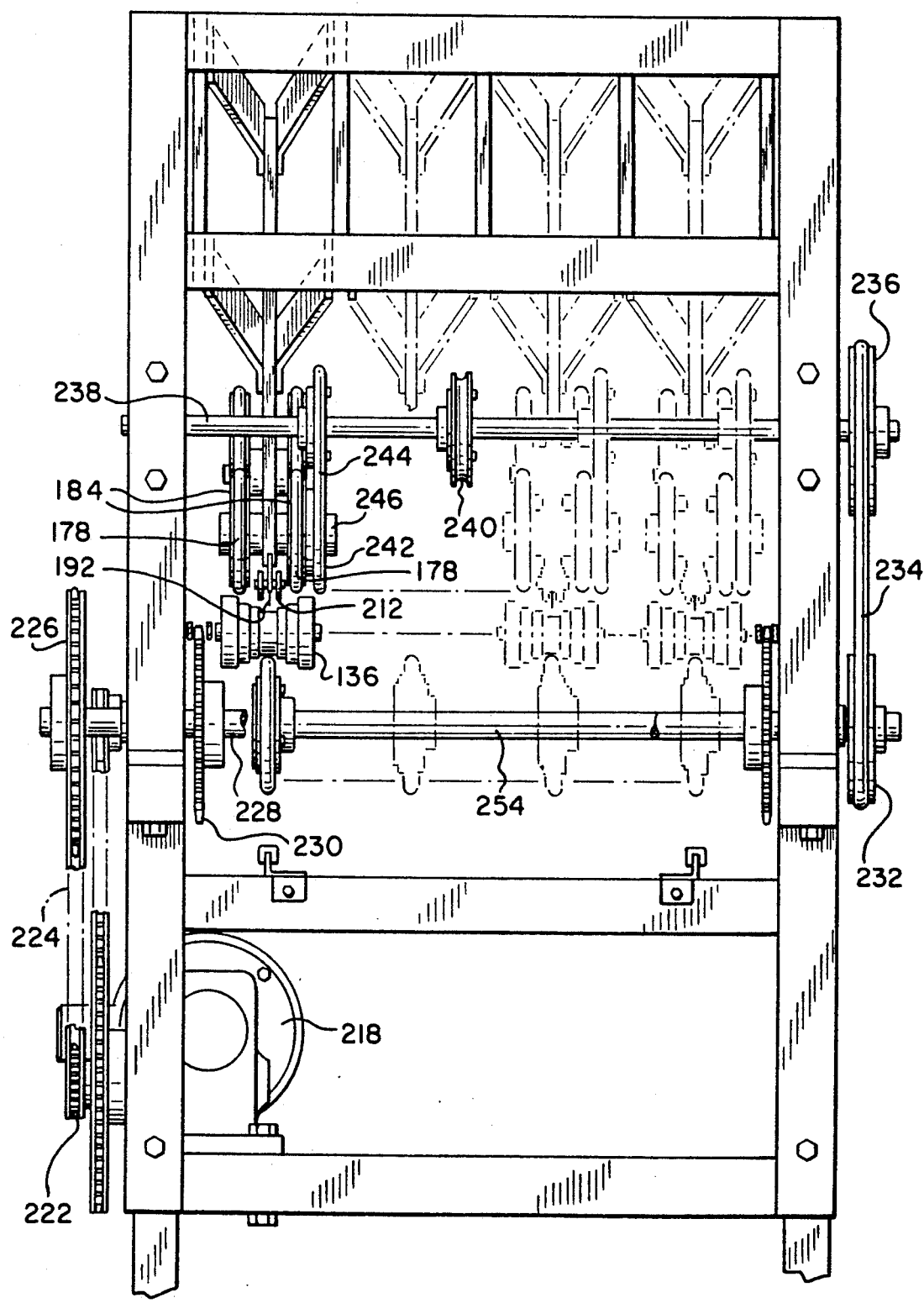
FIG. 16 is an end elevational view of the slitter of FIGS. 1 and 2 with numerous elements removed for the sake of simplicity of illustration.

The engagement of a plurality of pulley belts 144 for driving a corresponding plurality of spools 136 is best depicted in the enlarged end elevation view of FIG. 16. Each line or file of spools 136 on conveyor rod 134 is provided with a separate corresponding drive pulley belt 144. As shown in FIG. 15, four belts 144 are used in the illustrated embodiment. Pulley belt 144 on its upper travel path is nested within a conforming indentation 152 in a guide strip 154. Therefore, a firm pressure and traction is brought to bear between pulley belt 144 and a corresponding center surface 156 of each spool 136 in the corresponding file.

Between each rod 134 is a roller 158 as depicted in FIG. 14 and as better shown in FIG. 13. Roller 158 is free to rotate as the fruit rotates but serves as a bottom of the nest provided by two adjacent spools 136. Roller 158 prevents the smaller fruit from falling through or jamming conveyor 128. As shown in FIGS. 14 and 15, roller 158 is supported and connected to chain 132 by support 159. Only four supports 159 are shown in FIG. 14, for clarity, although it is to be understood that each roller 158 is supported, at both ends, by a support 159.

The oriented and perforated fruit now moves from the orienting section 142 of conveyor 128 to a slitting section 160, as depicted in FIG. 14. The four files of fruit as provided by the four files of spools 136 on conveyor 128 are then run underneath four moveable knife assemblies, each of which is generally denoted by reference number 162. The four knife assemblies 162 are coupled together on a rotatable frame 161, which is pivoted at pivot points 166 to rigid frame 168 of slitter assembly 150 and to a moveable frame arm 170 at pivot points 172. Arm 170 is therefore pivotally coupled to frame 168 by arms 164 in a four bar linkage. The weight of the entire slitter assembly 150 is counterbalanced by an extension spring 174 connected between an upper point on frame 168 and a lower point coupled to lower-most arm 164. Therefore, as slitter assembly 150 is dropped, or rotates counterclockwise in the depiction of FIG. 14, spring 174 is extended. The force tending to lift slitter 150 up from conveyor 128 is adjusted through turn buckle 176, so that a very slight downward pressure is maintained which will cause slitter assembly 162 to almost rest on the top of spools 136 in the absence of fruit, but will allow the presence of fruit within spools 136 to lift slitter assembly 162 upwardly without seriously retarding the forward movement of the fruit along conveyor 128. The degree of force that is required in order to lift slitter assembly 150 is therefore adjusted by adjusting turn buckle 176, which in turn adjusts the tension of spring 174. In other words, the fruit hold-down force is adjusted through a spring-loaded, four-bar linkage.

Lower end of spring 174 is coupled to a block stop 175. Block stop 175 is bolted by bolt 177 to the lower arm 164 and provided with an adjustment slot 179 at its lower end through which a bolt 181 is provided. The orientation of bolt 181 in slot 179 allows block stop 175 to be canted with respect to arm 164, so that its upper end 183 can be moved toward or away from frame 170. Contact between end 183 and frame 170 serves as a stop which prevents rotation of slitter assembly 150 further down toward spools 136 than desired.

Each cutter assembly 162 is provided with a pair of driven belts 178, one of which is shown in FIG. 14 and both of which are shown in the end view of FIG. 16. As best shown in FIG. 16, belts 178 are positioned at or near the edges of spool 136 and therefore will contact a top and bottom latitude on the surface of the fruit positioned below belts 178 in the interstitial space between two adjacent spools 136. As shown in FIG. 14, belt 178 is provided with an inclined section 180 standing between pulleys 182 and 184 and a slitting section 185 extending between pulleys 184 and 186. A fourth pulley 188 is provided for tensioning of belt 178. Identical sets of pulleys 182-188 are provided on each side of slitter assembly 162, each set with a corresponding belt 178.

Figure 17:
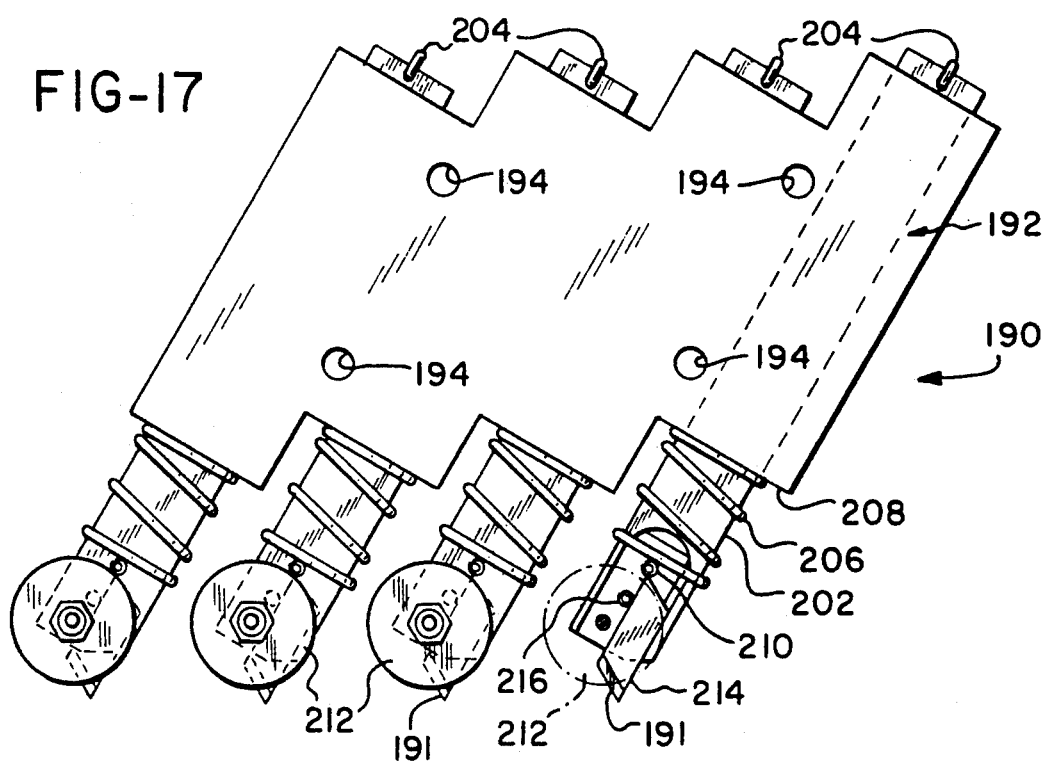
FIG. 17 is a side elevational view in enlarged scale of the slitter guide housing assembly used in the slitter of FIGS. 13-16.

Positioned between spools 184 and 186 is a cutting knife assembly 190, as shown in FIG. 17. Cutting knife assembly 190 provides a plurality of exposed razor blade edges 191, best depicted in FIGS. 16 and 17, positioned above the equator of the fruit disposed in the interstitial space between two adjacent spools 136 moving underneath assembly 190.

In the illustrated embodiment, belt 178 is being driven at a speed in the same direction and approximately 5% faster than the rotational rate of the fruit in the interstitial space between spools 136. This differential in speed insures that the fruit is not kicked out of conveyor 128 when it contacts slitter assembly 162, and provides additional motive force to overcome the frictional drag which the multiple blades will apply to the fruit when cutting into it in section 182 of slitter assembly 162.

The fruit is then cleanly slit along its equator by knife assembly 190 and delivered off the right hand of conveyor 128 in FIG. 14 to elevator 22 shown in FIGS. 1 and 2.

Figure 18:
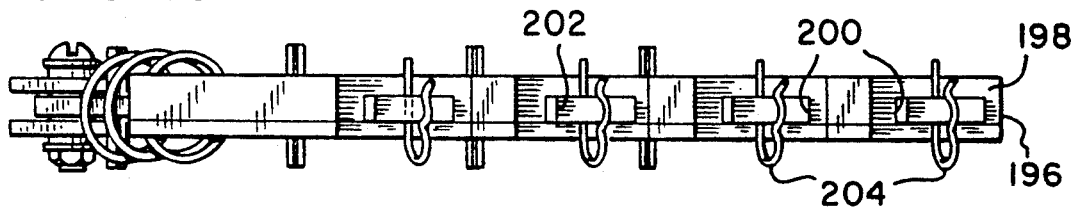
FIG. 18 is a top elevational view in enlarged scale of the slitter guide housing assembly used in the slitter of FIGS. 13-16 and as shown in FIG. 17.

Details of the knife assembly 190 which is clamped between the two groups of pulleys 184 and belts 178 of each assembly 162, are better depicted in the side elevation view in enlarged scale of FIG. 17 and the top elevation view of FIG. 18. In the illustrated embodiment, knife assembly 190 is comprised of a two part guide housing 192, through which four bolt holes 194 are provided. The guide housing 192, in turn, is comprised of a lid 196, best depicted in FIG. 18, and a base 198. Inside base 198 are four longitudinal channels 200 into which four separate knife bodies 202 are disposed. The upper end of each knife body is provided with a cotter pin 204 to retain it within housing 192. The lower end of the knife body 202 extends from the bottom of housing 192 and is forcibly extended therefrom by a compression spring 206. One end of spring 206 bears against face 208 of housing 192 and the other end bears against a spring retention pin 210. The end of each knife body 202 is provided with a pair of idler spools 212, beyond which extends the cutting edge 191 of a knife or razor blade 214. Blade 214 extends within a slit defined in the end of body 202 and extends beyond spool 212, which serves to position the knife blade 214 with respect to the fruit surface to a depth of approximately ⅛" below the surface. Spring retention pin 210 serves as a stop which limits the degree of insertion of blade 214 into body 202, while a second pin 216 serves as a guide to orient edge 191 of blade 214 to appropriately position it within the receiving slit within body 202. Two such idler spools 212 are provided, one on each side of blade 214, giving the knife a symmetrical contact and feel with the fruit.

All the mechanisms of slitter 20 are driven by a single motor 218, as shown in FIG. 14. Motor 218 drives a gear reduction drive 220, which in turn drives two sprockets. A first smaller drive sprocket 222 drives chain 224, which in turn drives a larger sprocket 226. Sprocket 226 is coupled to a shaft 228, as shown in FIG. 16, which drives sprocket 230 and chain 132 to move the conveyor.

A larger sprocket 248 coupled to gear reduction drive 220 drives sprocket 250 via chain 252. Sprocket 250 is coupled to shaft 254, best depicted in FIGS. 13 and 16, which in turn is used to drive belts 144 and to spin spools 136 when in sections 142 and 160 of conveyor 128. Shaft 254 continues to the right (as shown in FIG. 16), and is connected to pulley 232. Pulley 232 is coupled via a belt 234 to pulley 236, which in turn drives shaft 238. Shaft 238 is coupled to four pulleys 240 which drive pulleys 242 via the crossed belts 244. Pulleys 242, in turn, are each coupled to a corresponding shaft 246 coupled to pulleys 184 of slitter assembly 162 used to drive corresponding belts 178.

Again, economy and efficiency is obtained by a single motor drive, and synchronization of each of the constituent mechanisms of slitter 20 is always maintained, notwithstanding normal variations of motor speed.

The Canister Pouring Lid

Canisters 26 on carousel 28 at loading position 26a of FIG. 1 are filled with fruit from holding bin 24 as previously described. A circular lid is then placed on the top of the canister with a flat neoprene seal, and a vacuum pulled down on the canister for three minutes, after which the vacuum is released and the lid is removed. Later, as canister 26 rotates on carousel 28 to the discharge position 26b, a pouring lid 254, as depicted in FIGS. 19 and 20, is placed on the top of canister 26. Canister 26 is supported on a balanced pair of pivots 27 diagrammatically shown in FIG. 2, so that it can be easily tilted and its contents poured out.

Canister pouring lid 254 is best depicted in the side elevational view of FIG. 20. Each canister 26 has a top band 256 provided thereon with a pair of diametrically opposing slotted catches 258. Pouring lid 254 is coupled to canister 26 by means of a pair of pivot points 260 and a locking assembly 262. Locking assembly 262 is comprised, in turn, of a pair of locking handles 264 best depicted in the top elevational view of FIG. 19. Locking handles 264 are connected to a rotatable rod 266 which diametrically extends across the diameter of pouring lid 254. The ends of rod 266 are provided with fixed plates 268 which extend downward over the side of top band 256, as shown in FIG. 20. The bottom of plate 268 carries a fixed pin 270 which is disposed in an arcuate slot 272 defined in plate 258, which is attached to band 256 Handles 264 are thus rotated, moving pin 270 in slot 272, to lock lid 254 down to the top of canister 26, as depicted in FIG. 20. Handles 264 are rotated clockwise as shown in FIG. 20 to rotate pin 270 out of slot 272 to release or unlock lid 254 from canister 26. When unlocked, lid 254 can then be rotated by means of main handle 274 about pivot points 260.

The surface of lid 254 is provided with a cover 276 made of expanded metal, which serves to retain the fruit within canister 26 even when canister 26 is tilted. When canister 26 is tipped forward, as shown in the dotted line in FIG. 2, when in the discharge position in 26b shown in FIG. 1 the fluid will be drained from canister 26 while the fruit is retained. The fluid exits canister 26 by flowing through expanded metal cover 276 and then through openings 278 provided in the front lower half of lid 254, which is depicted in the left of the illustration of FIG. 20. A splash cover 280 is rigidly connected to lid 254 by a plurality of rigid fingers 282 to define spaces 278. Splash cover 280 directs the fluid to prevent it from pouring on to conveyor 32 and to keep it pouring into the separator 30 when the canister 26 is acutely tilted, as shown in FIG. 2.

After all the fluid is removed from canister 26, lid 254 is unlocked from canister 26 by rotating either one of handles 264 clockwise in the illustration of FIG. 20 and removing pivot pins 260. Pouring lid 254 is then ready to be positioned on the next canister 26 rotated by carousel 28 into discharge position 26b.

The actual design of carousel 28 and the manner in which it is driven are entirely conventional. Motive power is supplied by an ordinary electric motor, with power transfer to the carousel 28 through a wheel which bears an air-filled rubber tire. Operation of the motor is programmed, in conventional fashion, to rotate the carousel 28 in sequential steps, to move canister 26 from loading position 26a to discharge position 26b in conformity with the predetermined fruit incubation period. Alternatively, the motor may be manually switched on and off.

The manner in which carousel 28 and its motive power and programming are implemented are believed to be well within the capacity of the ordinary, skilled practitioner, in the light of the teachings herein given.

It is likewise believed that the manner in which canisters 26 are sealed and vacuum is induced therein to infuse the enzyme solution into the albedo of the fruit, and subsequently released, is well within the skill of the ordinary practitioner

The Brush Bed

Figure 21A:
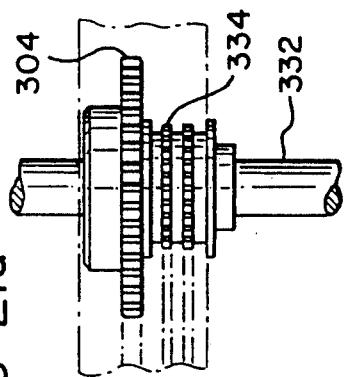
FIG. 21a is a plan view in enlarged scale of the conveyer sprocket and free wheeling collar of the brush bed of FIG. 21.
Figure 22:
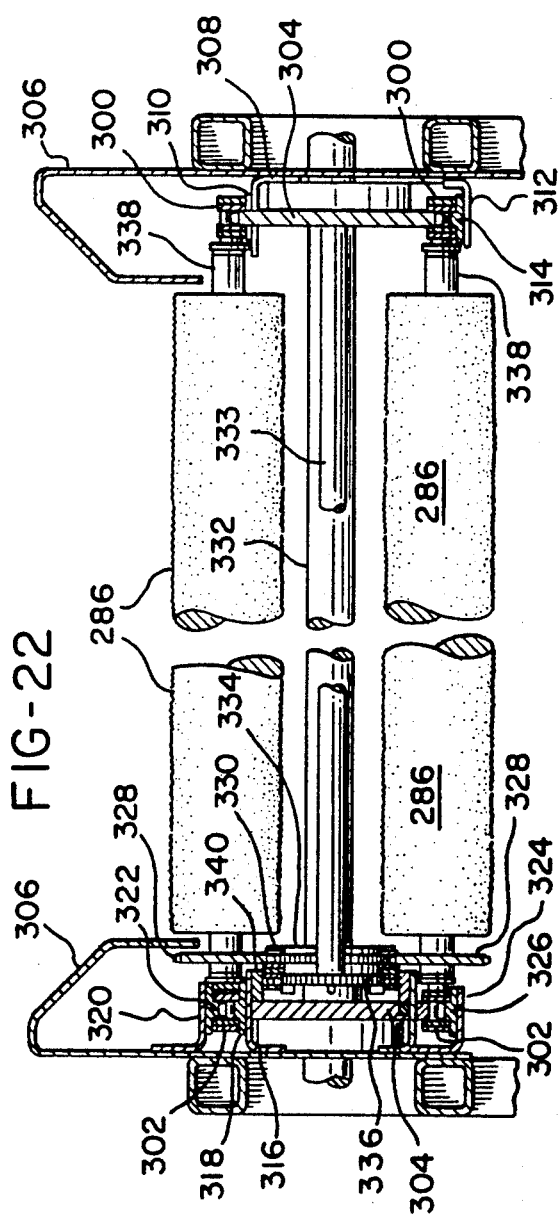
FIG. 22 is a simplified cross-sectional view of the brush bed as seen through lines 22—22 of FIG. 21.
Figure 21:
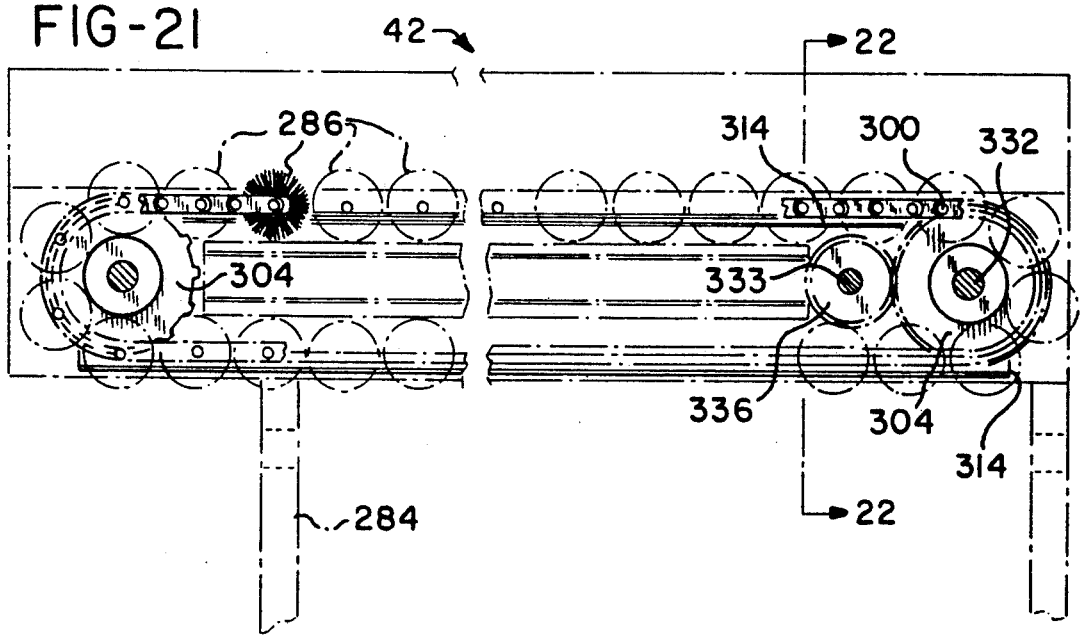
FIG. 21 is a simplified partially cutaway side view of the brush bed.

Brush Bed 42 of FIGS. 1 and 2 is better depicted in FIGS. 21 and 22. FIG. 21 is a simplified, partially cut away side view of brush bed 42. The movement of the conveyer is from left to right, as shown in that Figure. FIG. 22 is a simplified cross-sectional view of the brush bed of FIG. 21 taken through lines 22—22 of FIG. 21. Each brush 286 is mounted or rotatably connected at its opposing ends to a right hand chain 300 or left hand chain 302, as appropriate, and as best depicted in FIG. 22. Right hand chain 300 is connected to and disposed between sprocket spools 304. Chains 300 and 302 are enclosed within a protective left and right shield 306 which also provide a support or bearing platform for chains 300 and 302, and hence brushes 286.

Figure 23:
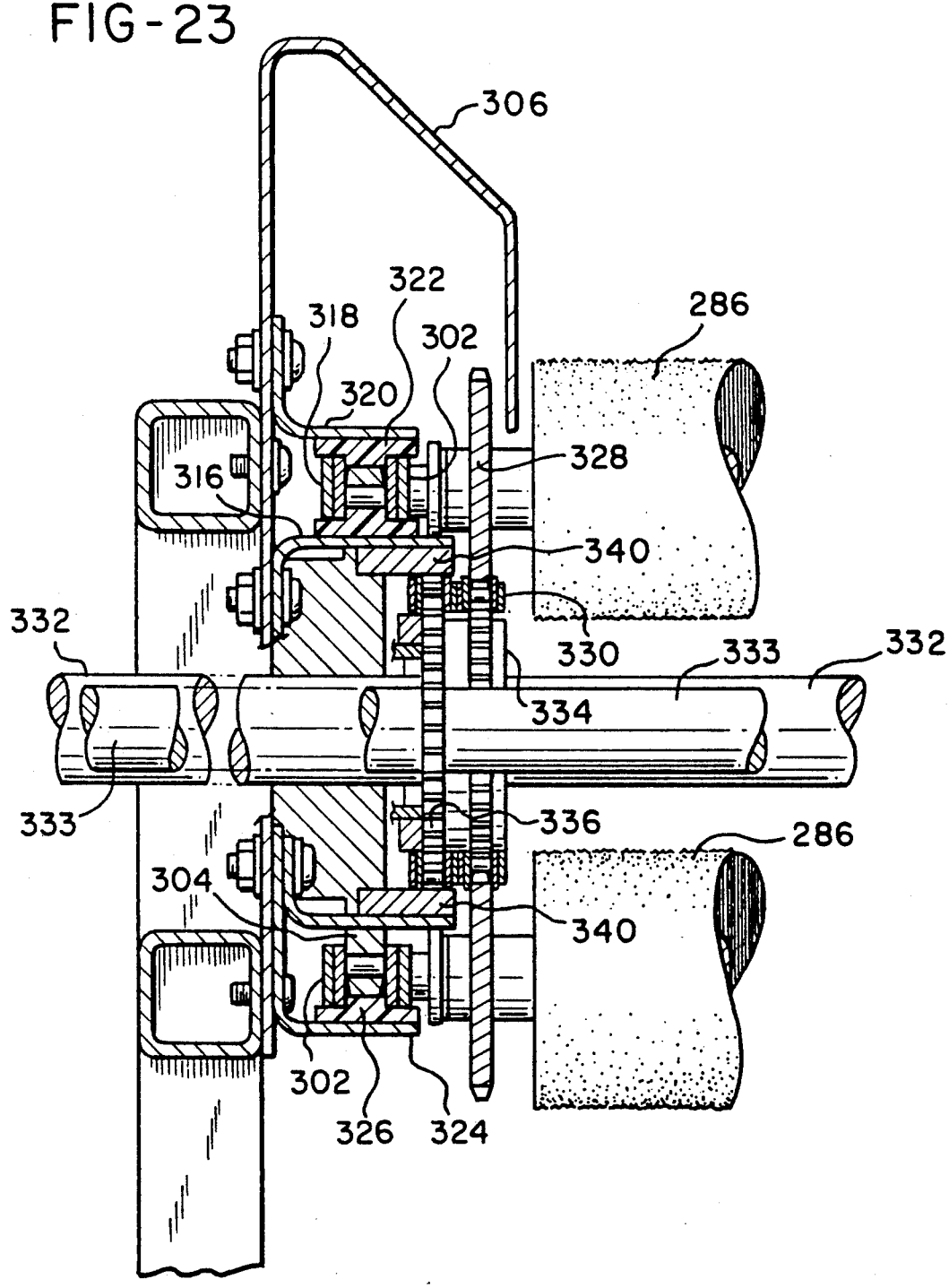
FIG. 23 is a simplified, enlarged-scale side elevational view of the end portion of the brush bed of FIG. 22, as seen through lines 22—22 of FIG. 21.

For example, in right hand support shield 306, an upper flange 308 supports a chain wear block 310. Similarly, a lower flange 312 provides a lower chain wear block 314. Chains 300 and 302 are supported by their corresponding wear blocks along their entire length. The left hand side of brush bed 42, as best depicted in FIG. 23, also includes an upper flange 316 supporting an upper chain wear block 318 and also an upper flange 320 positioning an upper chain hold down 322. A lower flange 324 similarly provides a lower chain wear block 326 for chain 302.

The left hand end of brushes 286 as depicted in FIG. 22 each include a sprocket 328. Sprockets 328 engage a double chain 330, which has two courses of side-by-side links.

Double chain 330 is driven by an inner smaller sprocket wheel 336, best depicted in FIG. 21, which is driven by axle 333 just seen in front of axle 332 in the depiction of FIG. 22. Sprocket wheel 336 engages the outside row of links of double chain 330 driving the chain at a much higher velocity than chains 300 or 302. Thus brushes 286 are spun on their axes 338 as they are collectively moved from left to right across the top of the conveyor as depicted in FIG. 21. The outside row of links of double chain 330, engaged with sprocket wheel 336, are also held down by chain hold downs 340. Thus brushes 286 serve to thoroughly brush the outside of the fruit meats as they are moved along brush bed 42 to the hydrocooler 46.

In the view of FIG. 22, axis 332, which is connected to sprocket wheel 304 for driving chain 300, has a freely rotatable collar 334 in contact with both the inner and outer courses of double chain 330. Wheel 304 and collar 334 are better shown in the simplified enlarged view of FIG. 21a. Collar 334 allows double chain 330 to remain engaged with sprocket spools 328 of brushes 286 as the brushes are pulled by chain 300 and 302 around sprocket spools 304. Misalignment problems, or reengagement problems which might otherwise occur if sprocket spools 320 were allowed to disengage with double chain 330, are thereby avoided.

Thus, the scouring action of the brushes 286 of the brush bed 42 removes any remaining netting and albedo residue from the fruit meats, while the movement of the brushes 286, from left to right in the configuration shown in FIG. 21, carries the fruit to a final inspection conveyor 44, which carries them toward the hydrocooler 46.

The inspection conveyor 44 is merely a conventional conveyor belt, which carries the cleaned fruit meats past one or more operators, for visual inspection and for removal of defective product.

The hydrocooler 46, not illustrated, comprises two elements. The first element is a bath of water, maintained near the freezing point. The cleaned fruit meats are delivered into this bath by the final inspection conveyor 44. Here, the fruit meats are chilled by the icy water. The other element is a conveyor which successively retrieves the cleaned and chilled fruit meats and passes them under a drenching shower of near-freezing water, whereby they continue to be cooled to near (i.e., just above) the freezing point, to retard spoilage, and are passed on for packaging.

Many alterations and modifications may be made by those having ordinary skill in the art, without departing from the spirit and scope of the invention. For example, although the illustrated embodiment is described with citrus fruit in mind, or at least fruit having a thick, cuttable peel, it must be understood that references to the meat or peel of the fruit must be considered in a very broad sense to include an extractable portion of some kind and a covering or disposable portion of some kind. Similarly, although the use of commercial pectinase has been described, the invention includes any type of treatment, now known or later discovered, for loosening the peel or covering of a fruit, nut, tuber or vegetable. Therefore it must be expressly understood that the illustrated embodiment has been shown only for the purposes of example, and should not be taken as limiting the invention, which is to include not only what is literally claimed, but all equivalents and equivalent means thereto which perform substantially the same function in substantially the same manner to obtain substantially the same result.

I claim:

1. The apparatus for peeling fruit having a meat and a peel adhering to and covering said meat, said peel having an outer surface, comprising:
   perforation means for providing access to at least a portion of said fruit between said meat and the outer surface of said peel;
   disposing means for disposing in said fruit a fluid to weaken the attachment between said peel and said meat; and
   removal means for removing said peel from said meat after its attachment to said meat has been weakened.

2. The apparatus of claim 1 further comprising slitting means for slitting said outer surface to separate said outer surface into a plurality of substantially separately defined portions.

3. The apparatus of claim 2 wherein said fruit has a core axis and an equator defined on said outer surface as the greatest circumference about said core axis, said slitting means adapted to slit said peel approximately on said equator.

4. The apparatus of claim 3 wherein said slitting means comprises orienting means for orienting said fruit to cause said core axis to be selectively oriented approximately in line with a predetermined direction to expose said equator to said slitting means in a predetermined mutual orientation.

5. The apparatus of claim 4 further comprising spinning means to cause said fruit to spin substantially about said core axis.

6. The apparatus of claim 1 wherein said disposing means comprises infusion means for infusing said fluid between said outer surface and said meat.

7. The apparatus of claim 6 wherein said infusion means comprises vacuum infusion means for vacuum infusing said fluid into said fruit.

8. The apparatus of claim 7 wherein said infusion means infuses a commercial pectinase solution at a temperature below approximately 20 degrees C.

9. The apparatus of claim 1 further comprising sterilizing means for sterilizing said fruit before said fruit is acted upon by said access means.

10. The apparatus of claim 1 wherein said removal means further comprises remnant cleaning means for removing remnants of attachments of said peel to said meat.

11. The apparatus of claim 1 further comprising packing means for packing said fruit meats after said fruit is acted upon by said removal means.

12. The apparatus of claim 11 further comprising cooling means for cooling said fruit meats to nearly 0 degrees C after said fruit is acted upon by said removal means.

13. The apparatus of claim 1 wherein said disposing means comprises:
   a plurality of containers for holding said fruit in said fluid;
   container moving means to move each of said containers from a loading position to a discharge position within a selected time interval and;
   infusing means for infusing said fluid between said peel and said meat.

14. The apparatus of claim 13 wherein said container moving means comprises rotatable carousel means and said containers are mounted near the periphery thereof.

15. The apparatus of claim 13 wherein said containers comprise canisters.

16. The apparatus of claim 13 wherein said selected time interval is that time period during which the fruit within container moving from said loading position to said discharge position is to be incubated in said fluid.

17. The apparatus of claim 15 further comprising a pouring lid selectively provided to that one of said plurality of said canisters in said discharge position, said pouring lid for retaining said fruit within said canister as said canister is tipped to pour said fluid from said canister, said pouring lid including means for directing flow of said fluid from said canister when poured from said canister.

18. The apparatus of claim 1 wherein said access means comprises:
   a substantially hollow drum having a longitudinal axis;
   a plurality of teeth disposed on the interior surface of said drum; and
   rotation imparting means for selectively rotating said drum.

19. The apparatus of claim 18 further comprising inclination means for selectively inclining said longitudinal axis.

20. The apparatus of claim 18 wherein said plurality of teeth are defined in spiral swaths on said interior surface, said spiral swathes being separated by portions of said interior surface without said teeth disposed thereon.

21. The apparatus of claim 18 further comprising:
a plurality of casters, said drum riding on said plurality of casters; and
an inclinable frame upon which said casters are mounted; wherein said rotation imparting means comprises:
a motor; and
coupling means motively coupling said drum to said motor to selectively impart rotational motion to said drum about said longitudinal axis; and wherein said drum and the mechanisms impinging thereon are collectively adapted to facilitate removal of said drum from said coupling means.

22. The apparatus of claim 18 wherein said plurality of teeth are integral to the material comprising said drum.

23. The apparatus of claim 9 wherein said sterilizing means comprises:
bath means for containing a sterilizing fluid;
paddle wheel means for submerging fruit disposed in said bath means into said sterilizing fluid and for imparting motion to said fruit in a predetermined direction within said bath means; and
retrieval means for retrieving said fruit from said bath means.

24. The apparatus of claim 23 wherein said retrieval means comprises finger wheel means adapted to lift said fruit from said bath means and to organize said lifted fruit into a row of fruit for delivery to said access means so that said retrieved fruit may be introduced into said access means sequentially as a file of fruit.

25. The apparatus of claim 23 wherein said paddle wheel means comprises a plurality of paddle wheels operatively interconnected to impart motion to said fruit in substantially a uniform direction.

26. The apparatus of claim 2 wherein said slitting means comprises:
conveyor means for moving said fruit prior to slitting, and
a slitter assembly for slitting said outer surface.

27. The apparatus of claim 26 wherein said conveyor means comprises a loading portion for positioning said fruit on said conveyor means with each said fruit disposed in one of a plurality of positions on said conveyor means within said loading portion.

28. The apparatus of claim 26 wherein said fruit has a core axis and an equator defined on the surface thereof as the greatest circumference about said core axis, and said conveyor means comprises an orienting portion wherein said core axis of each said fruit is oriented substantially in a predetermined direction.

29. The apparatus of claim 28 wherein said predetermined direction is substantially perpendicular to the linear movement of the fruit by said conveyor.

30. The apparatus of claim 29 wherein said slitter assembly produces a circumferential cut through said outer surface.

31. The apparatus of claim 30 wherein said cut is made approximately along said equator of said fruit.

32. The apparatus of claim 29 wherein said orienting portion comprises spinning means for causing each such fruit to spin substantially about its core axis.

33. The apparatus of claim 32 wherein said slitter assembly comprises:
driven belt means selectively disposed into contact with said fruit to assist said conveyor means in spinning said fruit; and
knife means resiliently disposed toward said fruit so that said spinning fruit comes into contact with said knife means and said knife means penetrates said outer surface.

34. The apparatus of claim 33 wherein said knife means is adapted to cut through said outer surface without substantially penetrating said fruit meat.

35. The apparatus of claim 33 wherein said driven belt comprises a pair of symmetrically disposed belts and said knife means is disposed between said belts.

36. The apparatus of claim 33 wherein said driven belt means is driven at a linear speed greater than the linear velocity of said outer surface of said fruit when spinning.

37. The apparatus of claim 33 wherein said knife means comprises:
a knife holder body;
a blade retained within said knife holder body;
contact means disposed on said knife holder body for contact with said fruit, said blade extending beyond said contact means to penetrate said outer surface of said fruit;
a compression spring disposed between said knife holder body and said blade to urge said blade away from said knife holder body toward said fruit; and
positioning means to prevent said blade from extending more than a predetermined distance beyond said contact means and said outer surface of said fruit.

38. The apparatus of claim 3 wherein said contact means comprises a pair of wheels symmetrically disposed about said blade and oriented so as to revolve when in contact with said spinning fruit.

39. The apparatus of claim 33 when a plurality of said knife means is provided.

40. The apparatus of claim 37 wherein a plurality of said knife means is provided.

41. The apparatus of claim 38 wherein a plurality of said knife means is provided.

* * * * *